Nov. 20, 1962 W. V. BROWN 3,065,328
SHEET FORMING AND SEAMING MACHINE
Filed April 27, 1959 15 Sheets-Sheet 1

INVENTOR.
WALTER V. BROWN
BY
Moore, White & Burd
ATTORNEYS

Nov. 20, 1962

W. V. BROWN 3,065,328

SHEET FORMING AND SEAMING MACHINE

Filed April 27, 1959

INVENTOR.
WALTER V. BROWN
BY
Moore, White & Burd
ATTORNEYS

Nov. 20, 1962

W. V. BROWN 3,065,328

SHEET FORMING AND SEAMING MACHINE

Filed April 27, 1959

INVENTOR.
WALTER V. BROWN
BY
Moore White & Burd
ATTORNEYS

Nov. 20, 1962 W. V. BROWN 3,065,328
SHEET FORMING AND SEAMING MACHINE
Filed April 27, 1959 15 Sheets-Sheet 5

INVENTOR.
WALTER V. BROWN
BY
Moore White & Burd
ATTORNEYS

INVENTOR.
WALTER V. BROWN
BY Moore, White & Burd
ATTORNEYS

Nov. 20, 1962 W. V. BROWN 3,065,328
SHEET FORMING AND SEAMING MACHINE
Filed April 27, 1959 15 Sheets-Sheet 9

INVENTOR.
WALTER V. BROWN
BY
Moore, White & Burd
ATTORNEYS

Nov. 20, 1962 W. V. BROWN 3,065,328
SHEET FORMING AND SEAMING MACHINE
Filed April 27, 1959 15 Sheets-Sheet 10

INVENTOR.
WALTER V. BROWN
BY
Moore, White & Burd
ATTORNEYS

Nov. 20, 1962  W. V. BROWN  3,065,328
SHEET FORMING AND SEAMING MACHINE
Filed April 27, 1959  15 Sheets-Sheet 11

INVENTOR.
WALTER V. BROWN
BY Moore, White & Burd
ATTORNEYS

Nov. 20, 1962 W. V. BROWN 3,065,328
SHEET FORMING AND SEAMING MACHINE
Filed April 27, 1959 15 Sheets-Sheet 12

INVENTOR.
WALTER V. BROWN
BY
Moore, White & Burd
ATTORNEYS

Nov. 20, 1962 W. V. BROWN 3,065,328
SHEET FORMING AND SEAMING MACHINE
Filed April 27, 1959 15 Sheets-Sheet 13
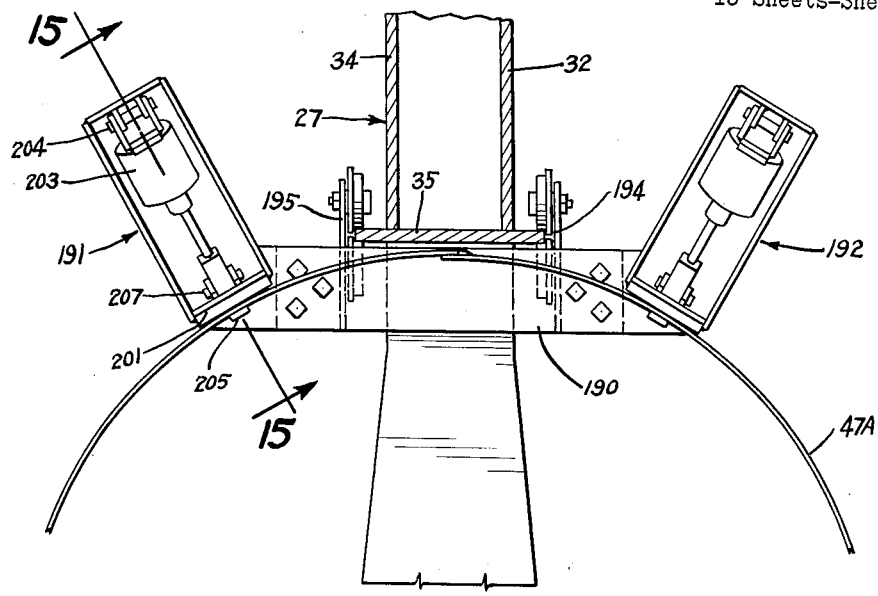
FIG. 14
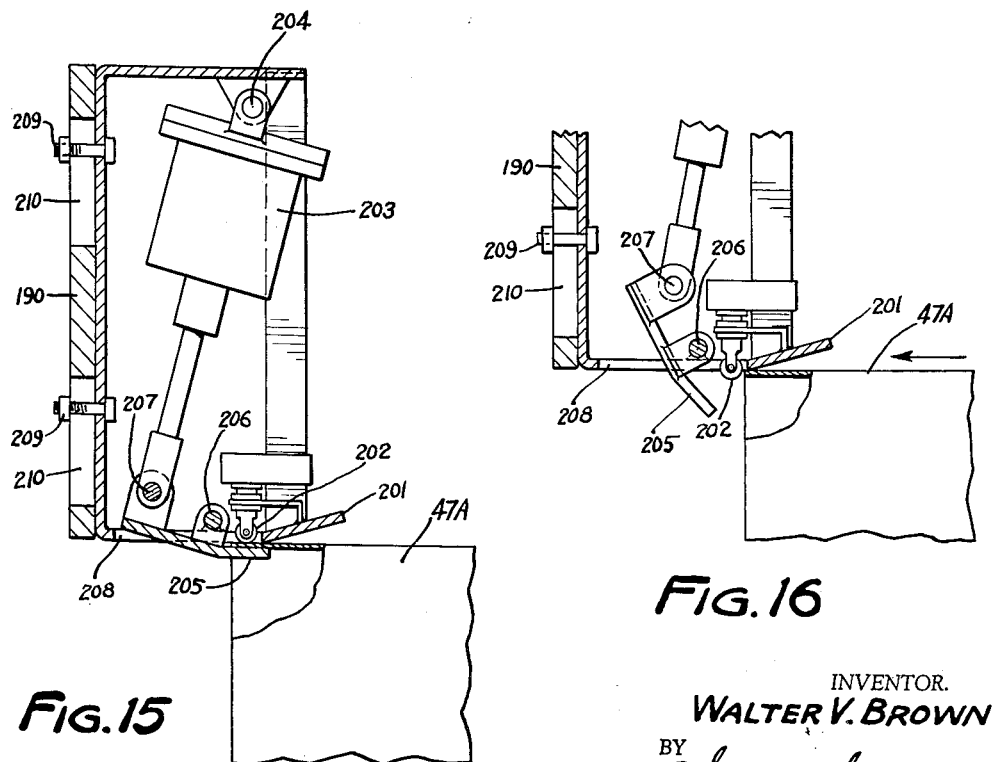
FIG. 15
FIG. 16
INVENTOR.
WALTER V. BROWN
BY Moore, White & Burd
ATTORNEYS INVENTOR.
WALTER V. BROWN
BY
Moore, White & Burd
ATTORNEYS Nov. 20, 1962  W. V. BROWN  3,065,328
SHEET FORMING AND SEAMING MACHINE
Filed April 27, 1959  15 Sheets-Sheet 15

INVENTOR.
WALTER V. BROWN
BY
Moore, White & Burd
ATTORNEYS

United States Patent Office 3,065,328
Patented Nov. 20, 1962

3,065,328
SHEET FORMING AND SEAMING MACHINE
Walter V. Brown, Minneapolis, Minn., assignor to Brown Steel Tank Company, Minneapolis, Minn., a corporation of Minnesota
Filed Apr. 27, 1959, Ser. No. 809,062
8 Claims. (Cl. 219—60)

This invention is semi-automatic sheet forming and seaming machine, and features among other structures a pivoted loading arm of very simple construction that, as it takes sheets of material from a stack near the machine, lifts them to provide the energy to permit use of a gravity conveyor. After the sheet has been carried on the conveyor to the forming position, automatic arms and mandrels form the sheet into the desired shape with the edges adjacent each other ready for seaming. While held, the sheet edges are welded. Planishing of the finished weld accompanies ejecting from the machine. Another featured structure is the frame having opposed vertically misaligned cantilevered arms. These arms support various portions of the mechanism and make it possible to cold work the seam of the sheet, as it is removed from the forming mandrels. Yet another featured structure of the device is the operator's platform which automatically moves in close to the machine to permit the operator to observe closely certain steps in the process of welding the sheet. Alternately the platform swings out of the way when major elements of the machine would otherwise strike it as they move.

Accordingly, it is the principal object of this invention to provide an improved sheet forming and seaming machine. Another object of this invention is to make such a sheet forming and seaming machine that is at least semi-automatic in operation. A still further object of this invention is to provide such a machine that is relatively simple in its construction. Yet another object of this invention is to provide the operator with a close view of the work as it progresses while holding him clear of moving parts of the machine. Another object of this invention is to provide such a machine that is capable of cold working, otherwise known as planishing, a seam after it is welded, and will eject the sheet as it is being planished along the formed seam. It is also an object of this invention to provide such a machine that supports and guides the formed and seamed sheet as it is being ejected.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 7 is drawn to the same scale as used in FIGURE 6; broken lines illustrate hidden parts.

FIGURE 14 is a fragmentary section taken on the line 14—14 of FIGURE 12 and drawn to the same scale as FIGURES 8, 9, 11, and 13.

FIGURE 15 is a sectional view taken on the line 15—15 of FIGURE 14 and drawn to the same scale as FIGURES 8, 9, 11, 13, and 14.

FIGURE 16 is a fragment of FIGURE 15 shown in a different position and illustrating how the sensing wheel operates; the scale used is that of FIGURES 8, 9, 11, and 13–15.

Figure 17A:
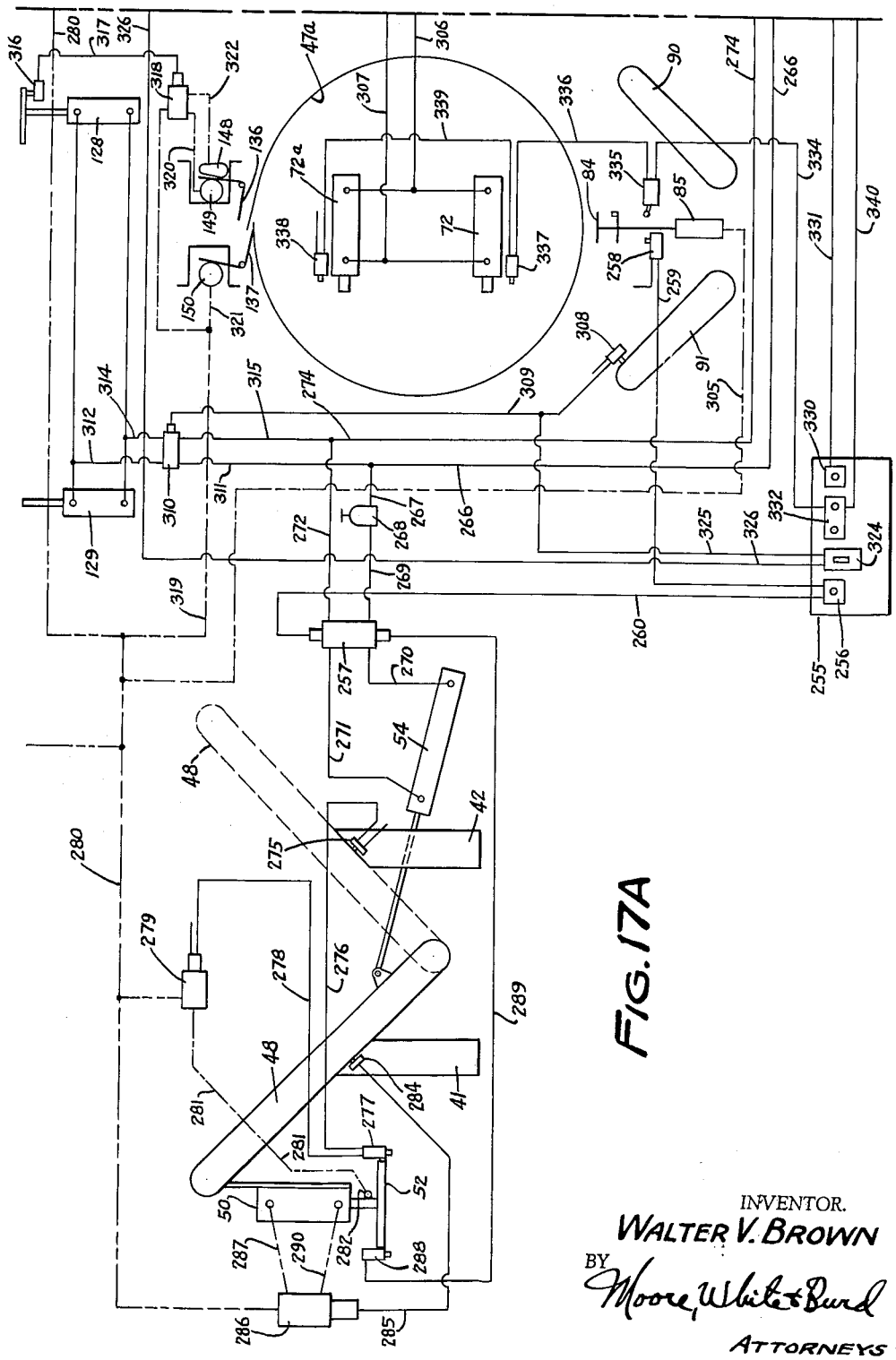

FIGURE 17a is a partial view of a combination, air hydraulic, and electrical diagram together with schematic representations of various elements that are actuated by and which actuate them. In the diagram, air is distinguished from the other elements by being shown in irregular broken lines. Broken lines are used to illustrate an adjusted position of the loading arm.

Figure 17B:
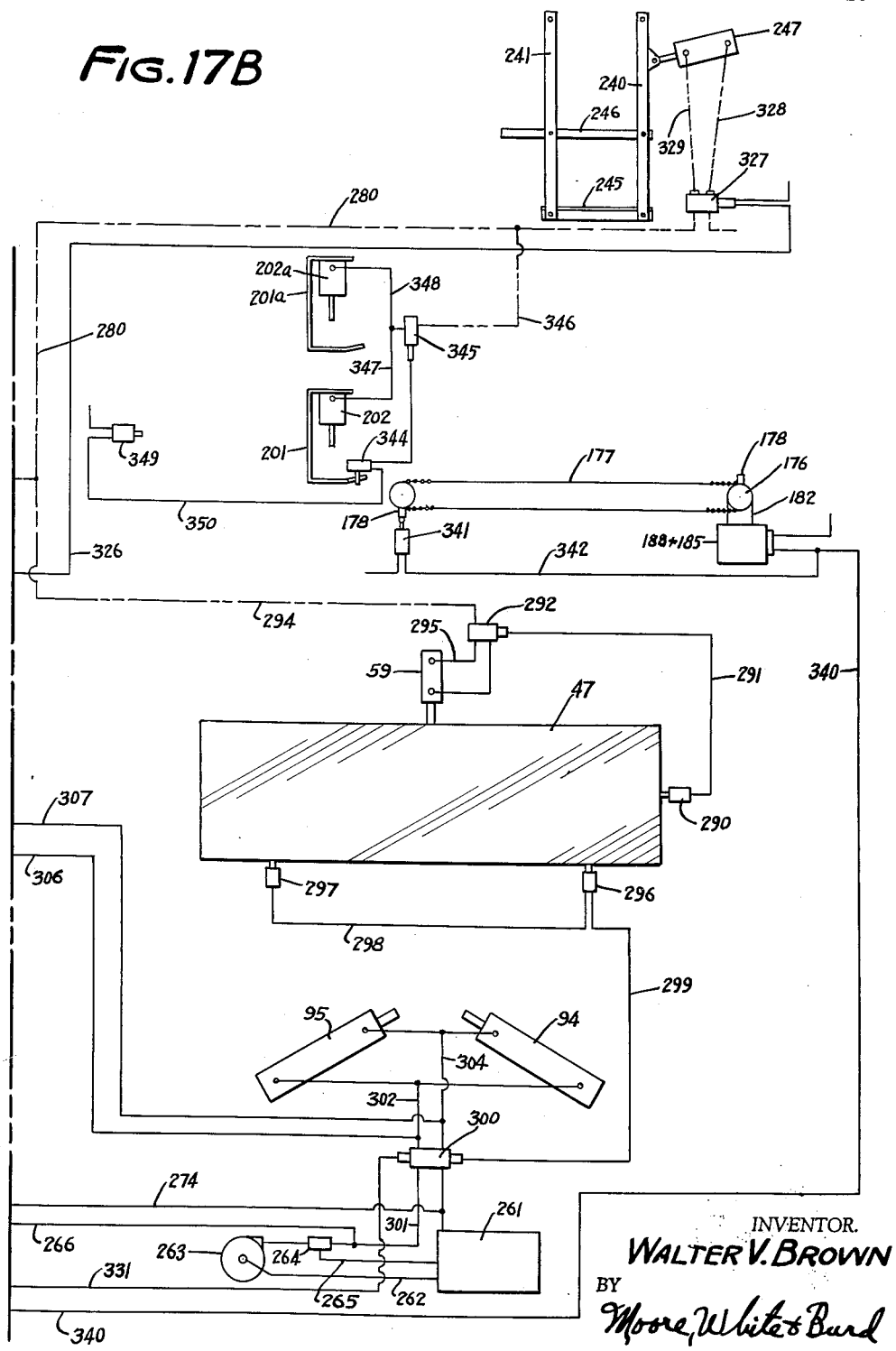

FIGURE 17b is a partial view of the diagrammatic representation of the machine complementary to the view shown in FIGURE 17a.

While this machine is a unitary one for forming and seaming sheets, it is to be described in portions in order to avoid confusion. The first portion to be described is that which is called the frame. Although the machine is adaptable to a variety of sheet forming and seaming uses, one particularly useful form of it is a tank shell forming and seaming machine. It is this type of machine that is shown and described herein as illustrative of the structural principles involved.

Frame

Figure 1:
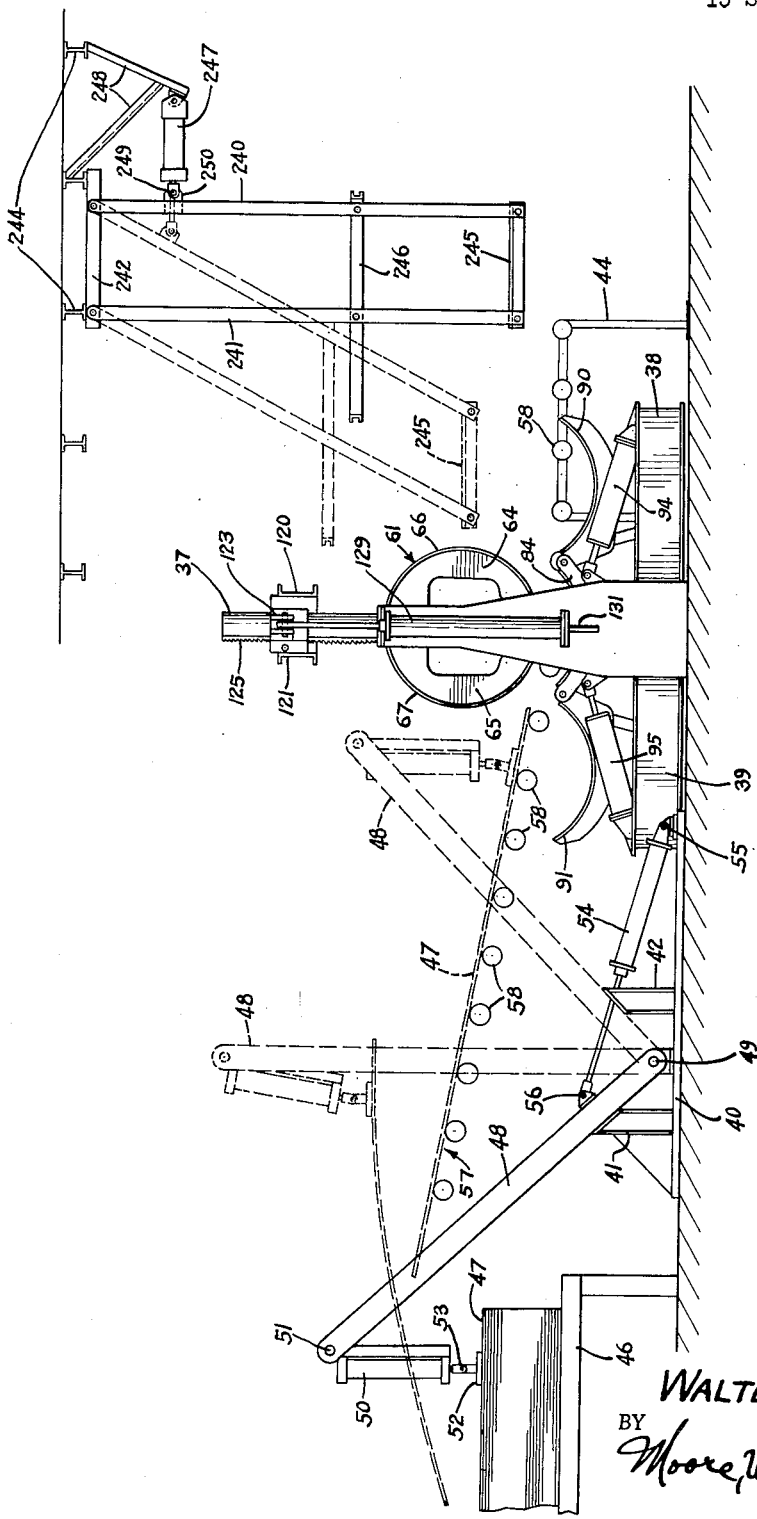
FIGURE 1 is a fragmentary and partially diagrammatic end elevation of the invention with broken lines showing adjusted positions of parts.

The frame will be described particularly in relation to FIGURES 1, 2, and 3 which show most of the frame elements, although on some of the other drawings greater details may be displayed. In FIGURE 1, the main or base frame element 20 may be seen in end elevation. This base frame element that is generally designated 20 may be seen, particularly in FIGURE 3 where it is shown in section, to consist of a pair of plate members 21 and 22 that are joined together by channel members 24 and 25. These elements together form a hollow I-section that is fabricated. To this base portion are secured the two cantilevered arms 26 and 27. As is clearly shown in FIGURE 2, these two cantilevered arms 26 and 27 are opposed to each other, and also vertically misaligned. The advantages of these opposed, cantilevered, vertically misaligned arms will be discussed later in connection with the functions made possible by their use. It is clear from viewing FIGURE 3 that the lower cantilevered arm member is also a fabricated hollow beam structure consisting of the upper plate 28, a lower plate 29 joined together by plates 30 and 31.

This same structure is the type preferred for cantilevered arm 27 and as shown to some extent in FIGURE 14 wherein a pair of vertical plates 32 and 34 are seen joined to the lower plate 35. However, the view is a fragmentary one and does not show the upper plate. The extremities of arms 26 and 27 overlap each other as shown in FIGURE 2. As shown in FIGURE 2, a pair of vertical columns are secured to extend above arms 26 and 27. The right-hand column is designated 36 and the one at the left 37. These columns are used to support the vertically moving clamping mechanism that will be described in detail later. In FIGURE 1, the elements of the frame that support the forming mechanism are designated as the auxiliary frame member 38 on the right and 39 on the left. These elements are also fabricated I-beam structure, but since this auxiliary frame structure is merely a lateral extension of the frame, it is not described in detail. To the left of auxiliary frame member 39 in FIGURE 1 may be observed the platform element 40 on which a loading mechanism is supported. A pair of angular stops 41 on the left and 42 on the right, as seen in that figure, complete the base structure for the loading mechanism. As shown in FIGURES 1 and 3, frame elements for supporting a gravity conveyor are also visible. The ones at the right in FIGURE 1 are designated collectively 44, while the ones at the left (not shown in FIGURE 1, but appearing in FIGURE 3) are designated 45 collectively. A suitable raw material stacking area, such as the platform generally designated 46 in FIGURE 1 at the extreme left, also might be considered part of the frame.

Loading—Squaring

As shown in FIGUES 1 and 3, the material to be loaded, such as the stacked sheet members 47 on loading platform 46, are within reach of a loading arm 48 that is pivoted to base member 40 as at 49. While the loading arm as shown in FIGURE 1 appears to be a single element, it is preferably an inverted U-element or bridge member pivotally supported on both sides of a space large enough to allow sheets 47 to pass through. The appearance of being a single element results from its being shown in side elevation only, which is completely adequate to illustrate how it operates. The loading arm 48 carries at its upper extremity a variable length element 50, which may be any suitable element of this type, and here illustrated as an air cylinder. This cylinder 50 is pivoted to the loading arm in any suitable manner as at 51, and carries on its lower extremity a sheet gripping element 52 of any suitable sort well-known in the art, and here illustrated as a vacuum cup. This vacuum cup is pivoted to the variable length element 50 in any suitable manner as by the pin 53. Any suitable power means may be used to pivot the loading arm and a suitable means is shown in FIGURE 1 as the hydraulic cylinder 54. It is suitably pivoted to the base 40, as by the pin 55, and to the loading arm 48 at 56. As shown in FIGURE 1, the loading arm 48 has just been moved to the left to inaugurate the loading of a sheet. As the sheet is gripped by gripping element 52, the arm is pivoted by hydraulic pressure being applied to the upper end of cylinder 54. This causes the cylinder to retract and to draw arm 48 into a position such as that shown by the first series of broken lines in FIGURE 1. At this point, the sheet is raised substantially higher than the work area of the machine, which means that it is possible to use to advantage a gravity type conveyor. A gravity conveyor requires no additional power and is, therefore, much less expensive than other types of conveyors. The loading arm does not drop the sheet onto the conveyor, but retains control of it to a point adjacent to the forming mechanism. The release position of the loading arm is shown by the right-hand series of broken lines illustrating the loading arm and gripping means in FIGURE 1. In this last-mentioned broken line illustrated position, arm 48 engages a limit switch on the arm stop 42 that initiates release of the sheet. A more complete description of the interaction of the various parts of the loading mechanism will be given in connection with the power diagram, FIGURES 17a and 17b. The energy stored in the sheet as it is carried by the pivoted loading arm over the rollers 58 of the conveyor 57, which are suitably journaled in the frame elements 45 and 46, is sufficient to advance the sheet into the machine until the sheet edge at the right-hand side in FIGURE 1 strikes a stop (not shown) located on the frame elements 44 in that figure. This stop is of a type well-known in the art and, therefore, is not illustrated or described. The striking of the stop also actuates a switch which energizes the squaring structure. This structure is illustrated in FIGURE 2, and is shown to be suitable extending means such as the air cylinder 59 which carries on its left-hand end, as viewed in that figure, pushing plate 60. In the actual machine, there are two of these pushing elements—one located on either side of the cantilevered arm 26—and each actuates a limit switch connected in series with each other to form part of a circuit that inaugurates the next stage of the operation. As these switches are connected in series, however, both of the squaring mechanisms must be fully extended in order for the next stage of operation to begin. With both of the plates 60 advanced to their limit, the sheet 47a is properly located and squared in the forming mechanism area and, therefore, it is assured that a properly-formed sheet will result.

Forming

Figure 2:
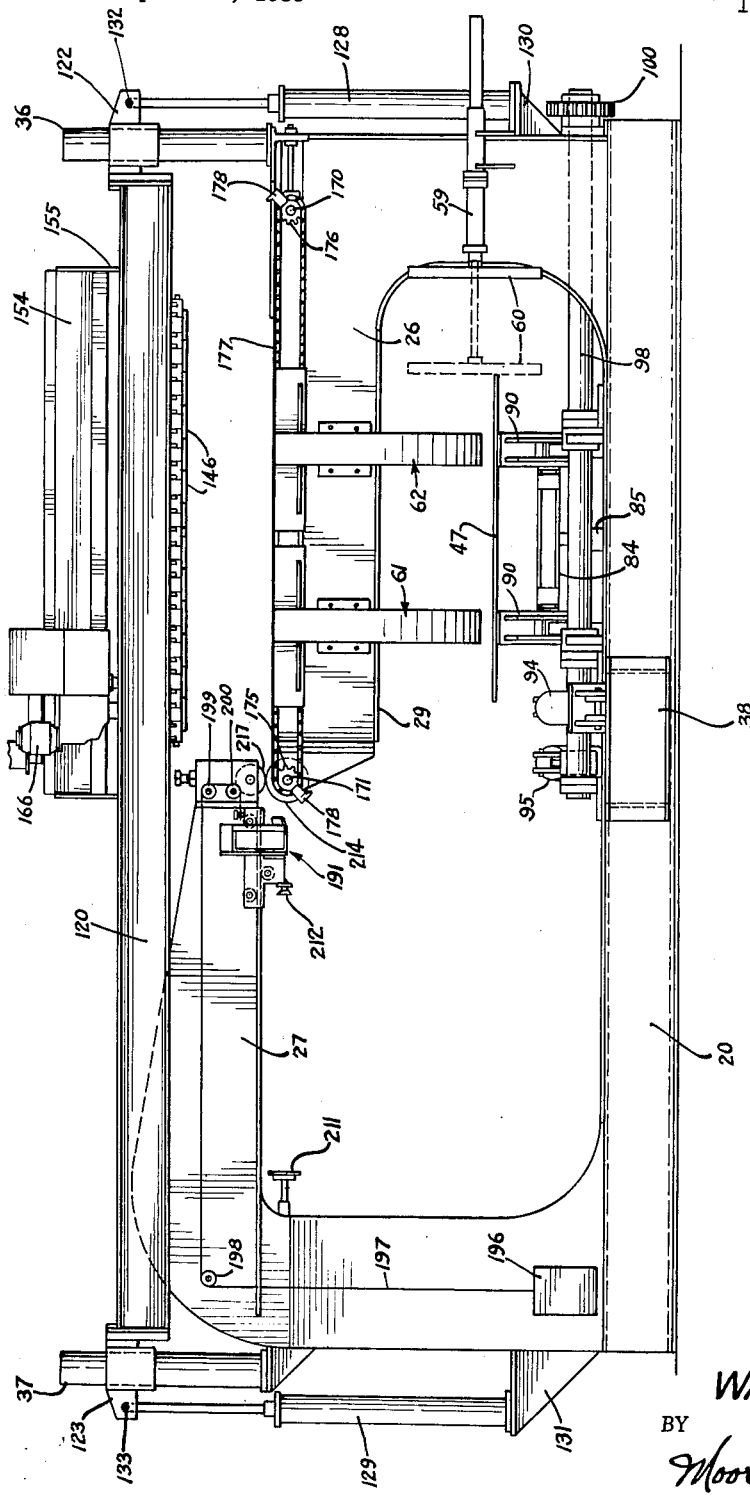
FIGURE 2 is an enlarged partial side elevation of the machine, portions of which are not shown for the sake of clarity; broken lines illustrate hidden and adjusted parts.
Figure 3:
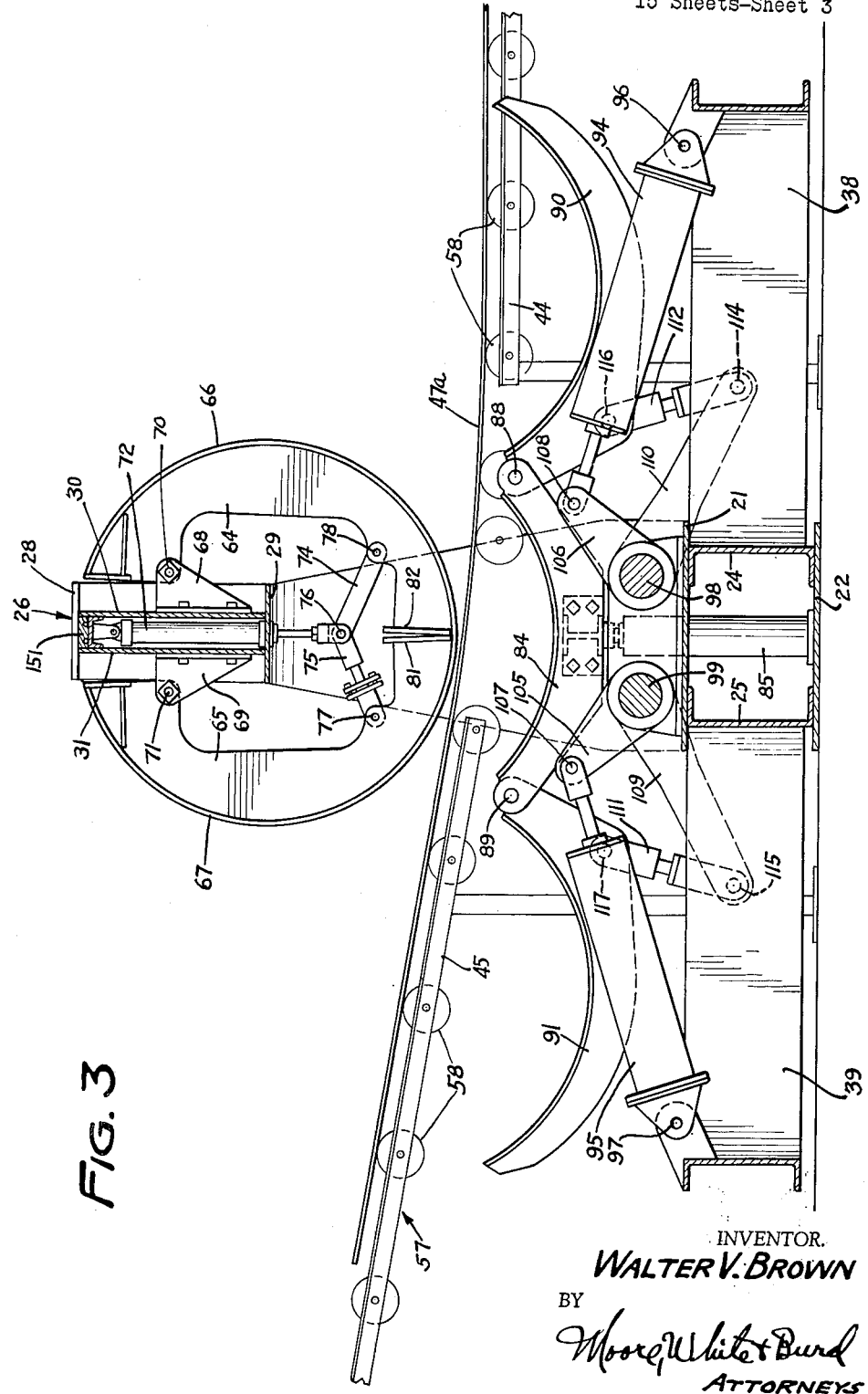
FIGURE 3 is a partial end elevational view showing in detail the sheet forming structure just as a sheet has become positioned in the machine; broken lines illustrate hidden parts; the scale used is still larger than that of FIGURE 2.
Figure 4:
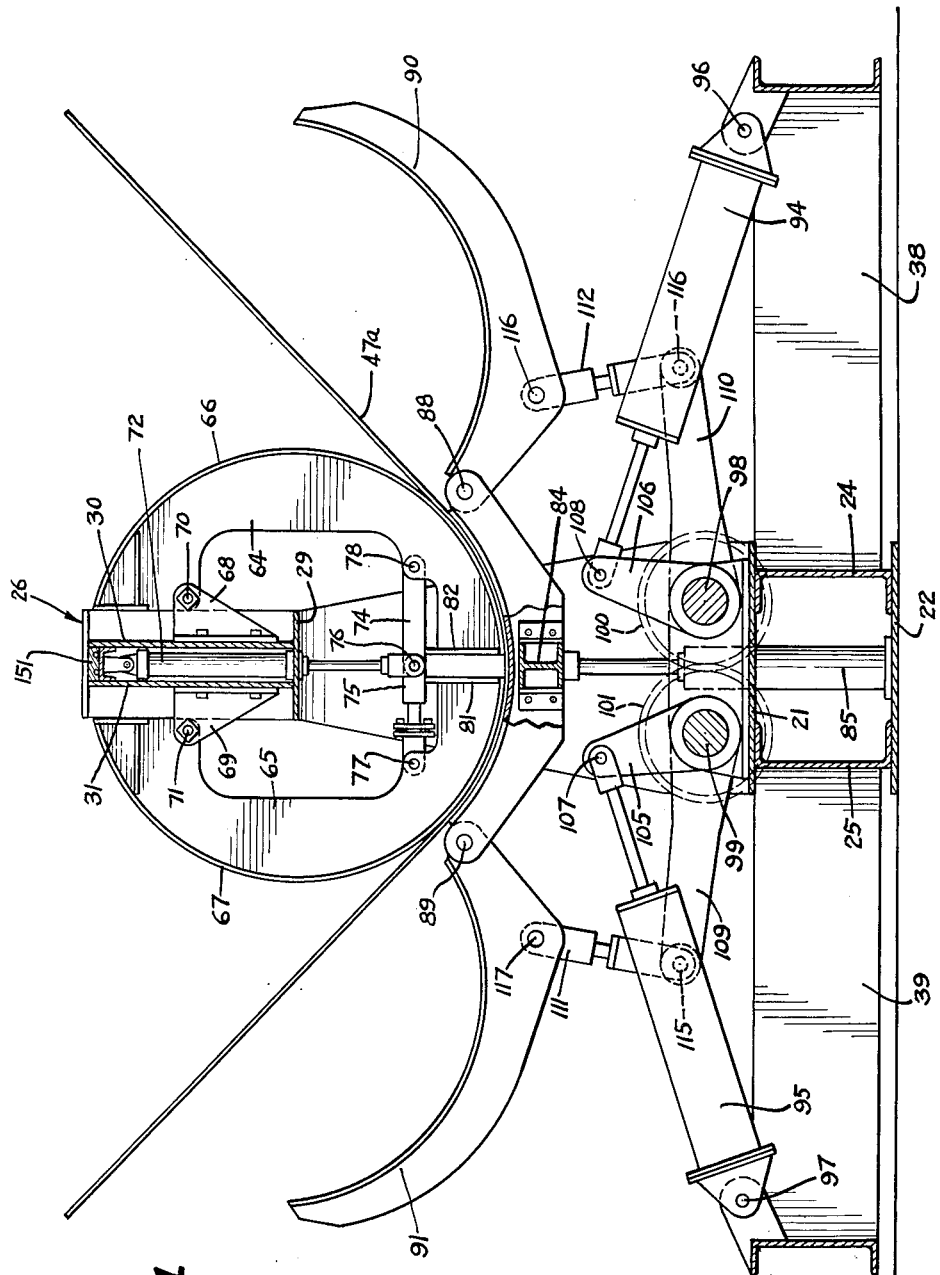
FIGURE 4 is a similar view to that shown in FIGURE 3, but with the forming mechanism moved to the first position in the process of forming a piece of sheet material; again, broken lines illustrate hidden parts.
Figure 5:
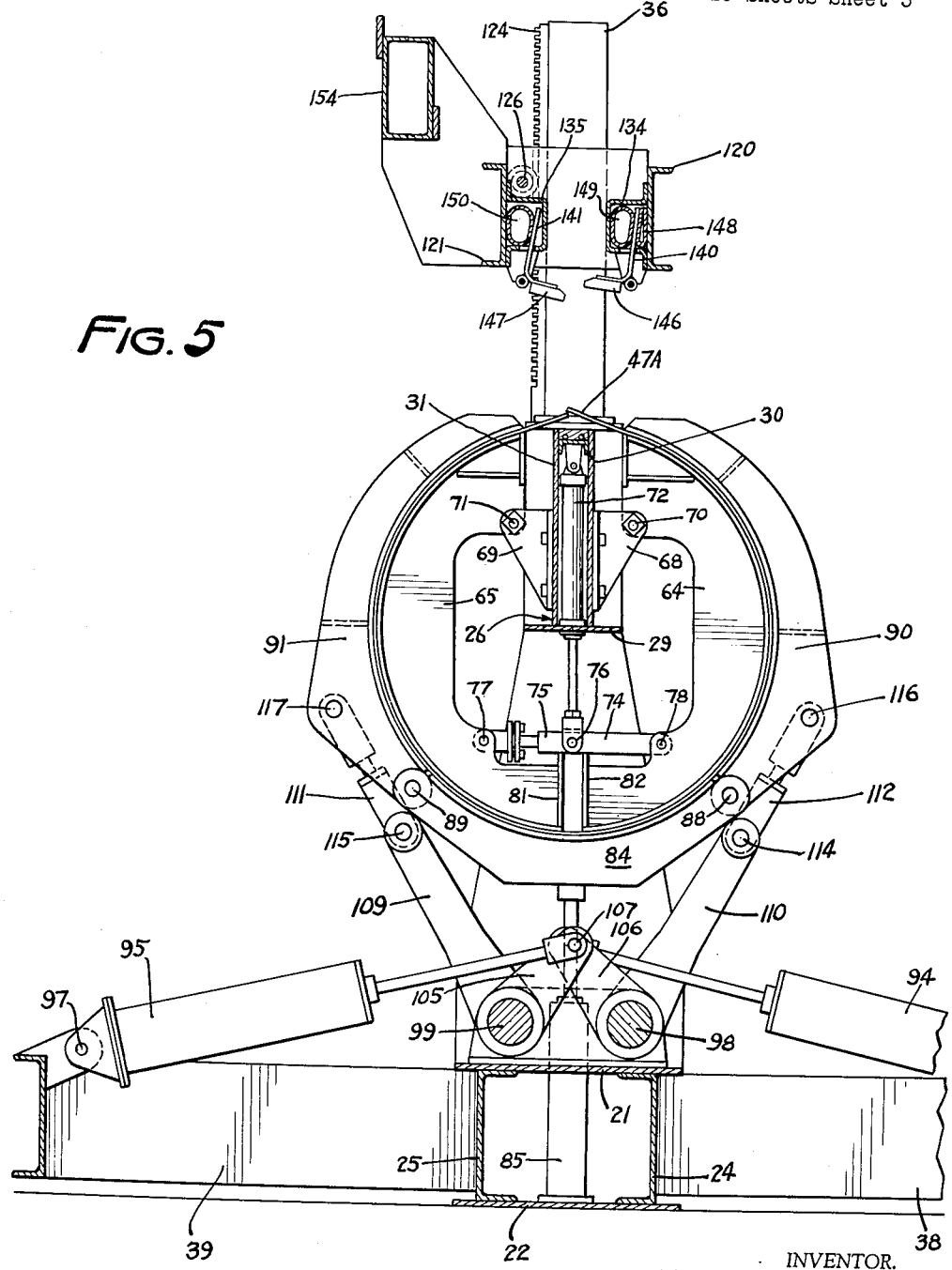
FIGURE 5 is similar to the view shown in FIGURES 3 and 4 except that the sheet is mainly formed as here illustrated, and also a portion of the seam clamping structure is shown. This view is the same scale as FIGURES 3 and 4, and it is partially in elevation and partially in vertical section; broken lines illustrate hidden parts.

Forming of the sheet preparatory to clamping and welding the seam is illustrated in FIGURES 3, 4, and 5. Reference is also had in this section, however, to FIGURES 1 and 2 wherein some other details of the forming structure are better illustrated than they are in the figures actually showing the operation of the forming mechanism. Referring first to FIGURES 3, 4, and 5, however, it will be observed that cantilevered arm 26 carries on each side of it a pair of fragmentary forming mandrels. As these pairs of forming mandrels are identical, only one pair will be described and numbered in detail, the two sets of mandrels being distinguished in FIGURE 2, for example, as 61 for the left-hand one and 62 for the right-hand one. Each half of a set of forming mandrels will be seen to consist of the form elements 64 for the right-hand one in FIGURES 3, 4, and 5, for example, and 65 for the left-hand one in those figures. These forming elements carry the surface plates 66 and 67 for the right- and left-hand forming elements, respectively, which are the actual surfaces around which a sheet is bent.

The surface plates are rigidly secured to the forming elements. A pair of suitable supporting brackets 68 at the right and 69 at the left in FIGURES 3, 4, and 5 support pivotally the left and right forming elements in any suitable manner, as at 70 and 71 for right and left, respectively. The brackets are rigidly secured to the plate elements 30 and 31 of cantilevered arm 26. In the hollow of hollow I-beam structure of cantilevered arm 26 is an extendable element 72 which serves as a means for expanding the fragmentary forming mandrels. This extending element may be any suitable type, and I have shown it here as a hydraulic cylinder, the piston rod of which is connected to the articulating link 74 for the right and adjustable articulating link 75 for the left forming elements. They are suitably pivoted to the piston rod as by the element 76, and to the two forming elements, left and right, respectively, by the elements 77 and 78. Links 74 and 75 bottom on the stop plates 81 and 82 and are secured to the left and right-hand forming elements, respectively, when cylinder 72 is extended as shown in FIG. 4. This action takes place immediately upon the locating of a sheet 47A at the proper position for forming. Hence, when forming begins, the mandrels are already in the proper position for that operation.

Figure 6:
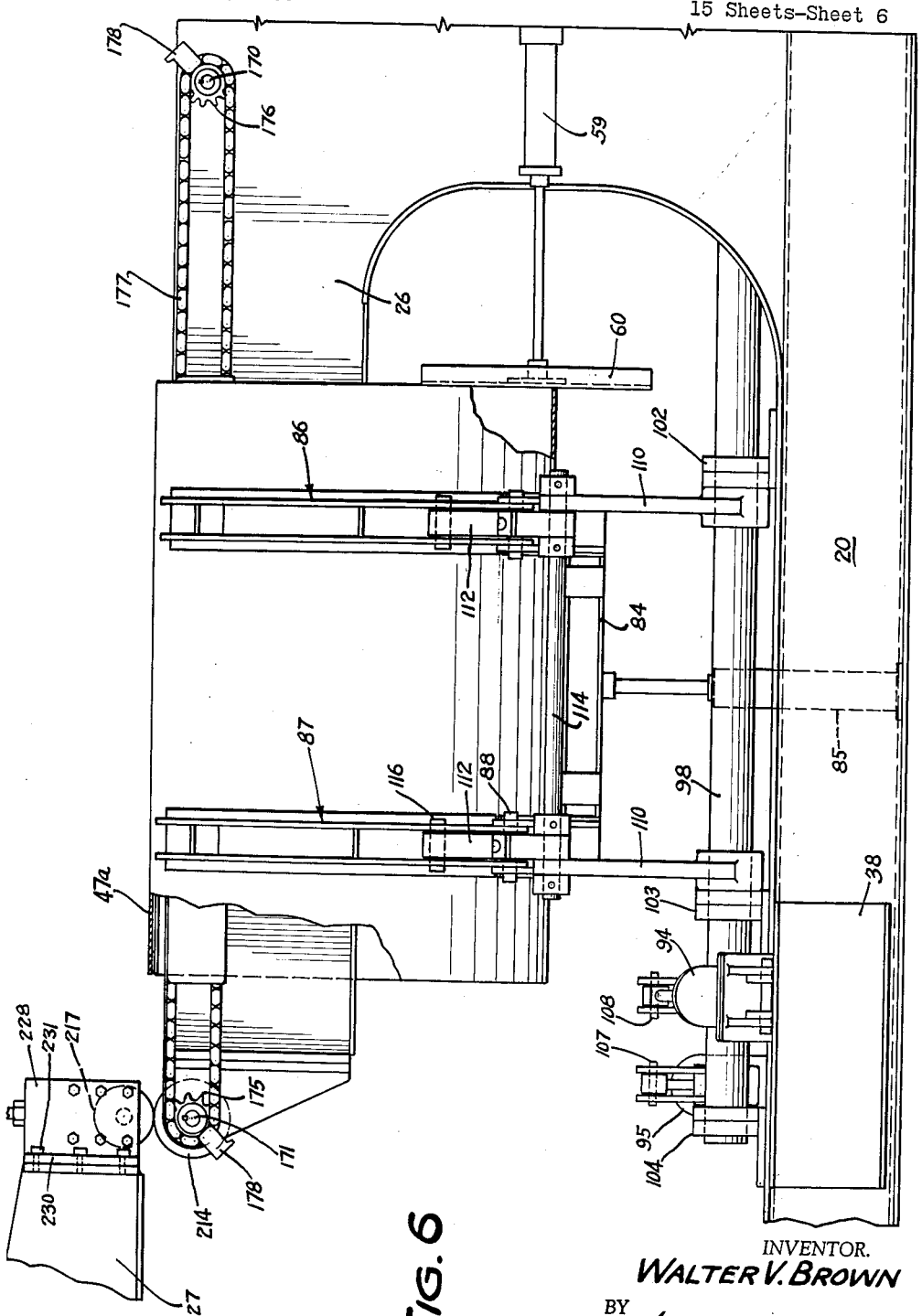
FIGURE 6 is a fragmentary side elevation of the machine with portions of the sheet being formed broken away to illustrate the structure of the machine; broken lines illustrate hidden parts; the scale used is that of FIGURES 3, 4, and 5.

Below the sheet 47A is the actual bending or forming mechanism. It consists of a central yoke element 84 that is movably supported in the central frame element by means of an air cushion cylinder 85 that is supplied with a constant source of air under pressure. It is restrained from extending at times, however, by the forming arm power cylinders described below. Secured to yoke 84 is a pair of matched forming arms which are aligned with the fragmentary forming mandrels. As is in the case of the forming mandrels, the two pairs of arms are identical and only one pair will be described. The two pairs of arms are generally designated 86 for the right-hand arms and 87 for the left-hand arms, however, as illustrated in FIG. 6.

The forming arms themselves, as illustrated in FIGURES 3, 4, and 5, are designated 90 and 91 for right and left arms, respectively. The lower ends of the arms are pivoted to yoke 84, as shown in FIGURES 3, 4, and 5, by any suitable means such as pins 88 and 89 for right and left halves of a pair of arms, respectively. Power to operate the arms is supplied by any suitable means, such as a pair of hydraulic cylinders designated 94 and 95 for the right- and left-hand arms, respectively. These cylinders are suitably pivoted to the frame elements 38 and 39 as at 96 for the right-hand arm and 97 for the left-hand arm. The cylinders 94 and 95 are suitably linked to the stub arm members 105 for the left and 106 for the right as seen in FIGURES 3, 4, and 5, respectively, by suitable pivots 107 for the left and 108 for the right. These stub arm members 105 and 106 are rigidly secured to a pair of synchronized rock shafts 98 and 99, respectively, for the right- and left-hand arms. Rock shafts 98 and 99 are synchronized by means of a pair of gears such as the ones shown clearly in FIG. 2 for the right-hand unit, and designated 100. These same gears are shown in broken lines in FIG. 4, and the right-hand one, of course, designated 100 and for the left-hand unit 101. By thus linking the rock shafts together, it is possible to cause the arms to move in precise synchronization with each other, thus bending the sheet evenly around the mandrels. Rock shafts 98 and 99 are suitably journaled in three double bearing elements designated 102, 103, and 104 in FIG. 6. These bearing elements are rigidly secured to the bottom frame element designated 21 in FIGURES 4 and 5.

Also rigidly secured to the rock shafts are the articulating arms 109 and 110 for the left and right, respectively, which in turn are pivoted to the adjustable articulating links 111 and 112 for the left and right arms by the pins 114 on the right and 115 on the left. The adjustable articulating links 111 and 112 are pivoted to their respective forming arms 91 and 90 by pins 116 on the right and 117 on the left as seen in FIGURES 3, 4, and 5.

At about the same time that the cylinder 72 is extending the fragmentary forming mandrels, cylinders 94 and 95 also begin to extend under the influence of applied fluid under pressure, as shown in FIG. 4. Forming arms 90 and 91, as they begin to move up, stop restraining air cylinder 85. No longer restrained by the hydraulic cylinders 94 and 95 holding down arms 90 and 91, the piston in air cylinder 85 that is constantly being urged upward by air pressure causes upward movement of the yoke 84 which engages the underside of the sheet 47A, and forces it into engagement with the forming mandrels, as shown also in FIG. 4. Rotation of the rock shafts, as shown in FIGURES 3, 4, and 5 by the extension of the cylinders 94 and 95, moves the forming arms up to engage and bend the sheet member 47A completely around the fragmentary mandrels, to assume the position shown finally in FIG. 5. When sheet 47A is thus substantially formed, clamping and welding can take place.

*Clamping and Welding*

Figure 7:
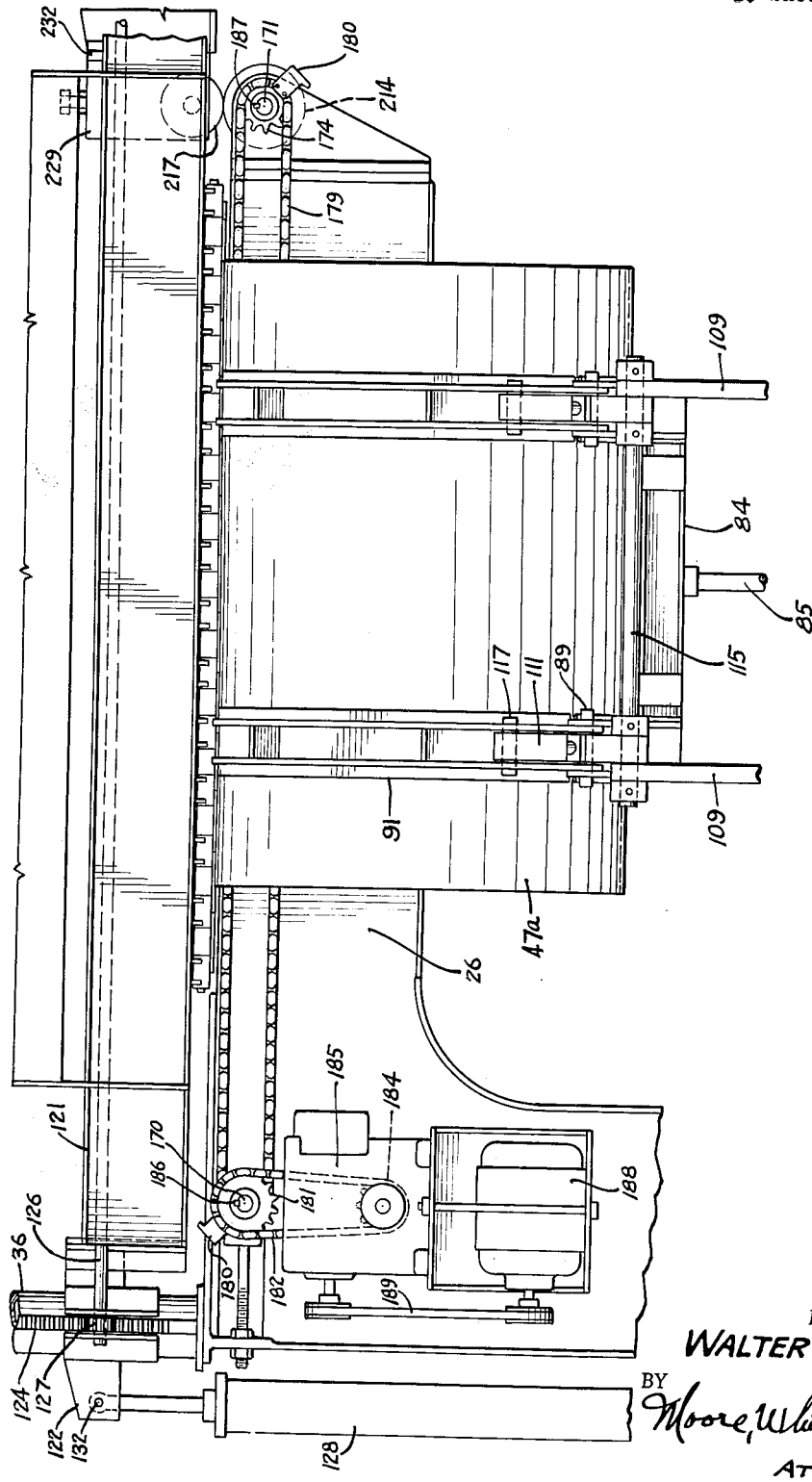
FIGURE 7 is a fragmentary side elevation of the machine from a side opposite to that shown in FIGURE 6.

Upon the completion of the forming step, as illustrated in FIG. 5, it is necessary to finish clamping the ends of the formed sheet member 47A so that they are properly held for welding. This operation is accomplished by a known clamping structure that is illustrated in FIGURES 1, 2, 5, 7, 8, 9, 10, and 11. It is described in some detail, however, so that its relationship to the rest of the machine is clearly understood. Referring now specifically to FIGURES 1 and 2, the clamping structure is seen to be supported on a fabricated beam element consisting of the side rails 120 and 121. These side rails are held in spaced relationship by collar structures at the end thereof and, as shown in FIG. 2, designated 122 for the right-hand collar assembly and 123 for the left-hand collar assembly. Collar assemblies 122 and 123 slidably engage the two column elements 36 and 37, respectively. Each column carries a rack, in the case of the right-hand column designated 124 and the left-hand column 125. Engaged to these rack assemblies are gears which are keyed to a shaft so that the two ends of the fabricated beam which carries the clamping assembly will be moved together. Only the left-hand one of the gears designated 127 is illustrated in FIG. 7, but it will be understood that there is a similar gear engaging the rack on the other end of the assembly. The shaft that connects the two gears is designated 126. Each of the collar assemblies can be moved vertically by an appropriate means and I have shown hydraulic cylinders 128 for the right- and 129 for the left-hand collar assemblies as shown in FIG. 2. The cylinders are supported on suitable pedestal brackets so that they are rigidly secured to their respective cantilevered arms, and the brackets are designated 130 for the right-hand one and 131 for the left. The pistons of cylinders 128 and 129 are pivoted to their respective collars by pins, such as 132 for the right-hand one and 133 for the left-hand one. Hydraulic power is applied to cylinders 128 and 129 to draw the beam assembly and the various attached mechanisms down adjacent to the formed sheet, as shown in section in FIGURES 8 and 9 and shown in side elevation in FIG. 7. There follows a detailed description of the clamping mechanism itself.

Figure 8:
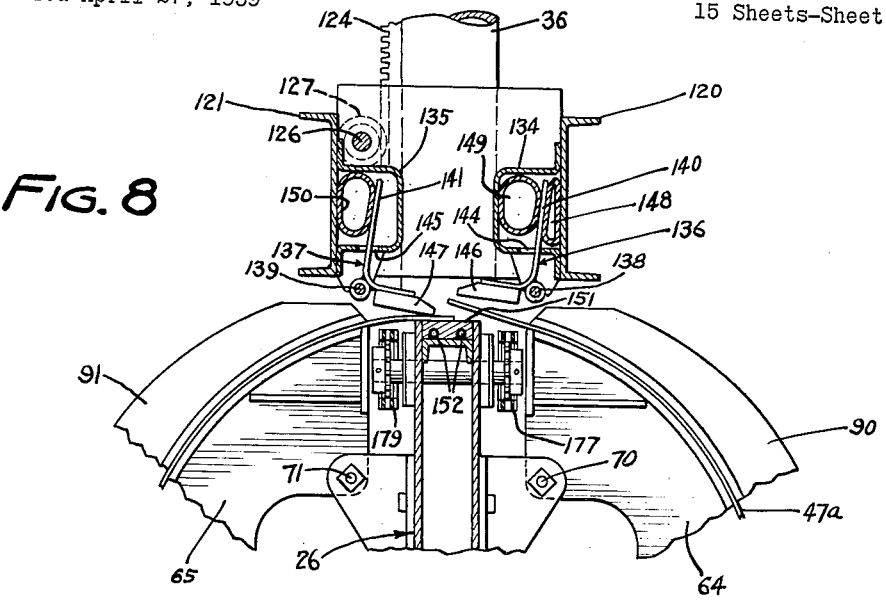
FIGURE 8 is a still further enlarged view of the clamping mechanism in detail; this view is partially in elevation and partially in vertical section.
Figure 9:
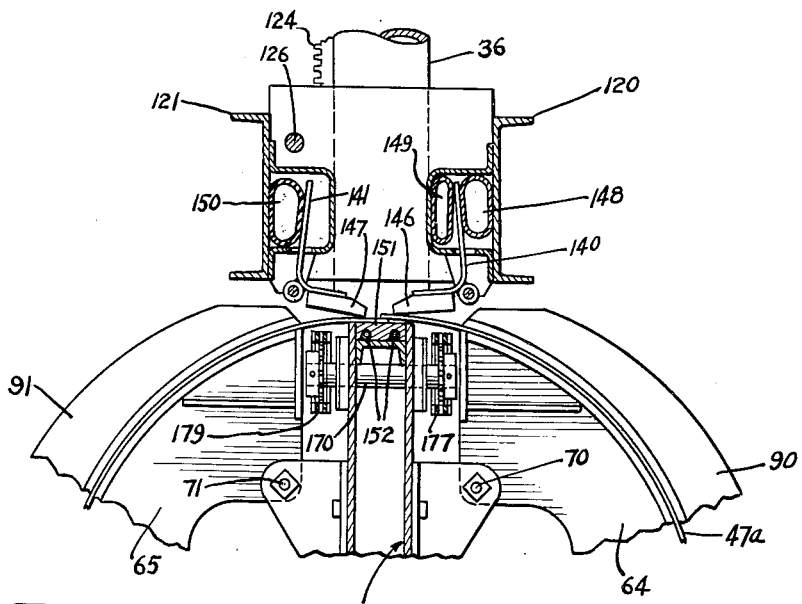
FIGURE 9 is a view similar to that of FIGURE 8 and the same scale but showing the right-hand clamping fingers in a different position.

This clamping mechanism is generally supported by a pair of hollow beams. These hollow beams are formed in part by the side plates of the clamp mechanism and in part by the flanged channel members which are designated 134 for the right-hand one in FIGURES 8 and 9 and 135 for the left-hand one. A series of clamping fingers is pivoted to each of the hollow beam members formed by the flanged channel members and the side elements 120 and 121 of the clamping mechanism carrying structure beam. These fingers, 136 for the right-hand ones and 137 at the left, have L-shaped cross sections, as is clear in FIGURES 8 and 9. These elements are pivoted at the juncture of their legs, as shown in those figures. The fingers are suitably pivoted as at 138 and 139, respectively, for 136 and 137. Flanged channel members 134 and 135 have openings at the bottom thereof through which longer legs 140 and 141, respectively, of fingers 136 and 137 extend. The openings are designated 144 and 145, respectively, for the right-hand and left-hand openings. Gripping fingers 136 and 137 are also provided with the gripping pressure elements 146 and 147, respectively, for right and left fingers. Inside the hollow beam are the air hoses designated 148 and 149 in the case of the right-hand hollow member, as viewed in FIGURES 8 and 9, and the one designated 150 for the left-hand hollow beam member as viewed in those figures. These air hoses can be expanded or collapsed by applying air under pressure or releasing it and actuating the clamping fingers. As shown in FIG. 8, the left-hand fingers 137 are down to clamp the end of sheet member 47A, while the right-hand fingers remain in the elevated position. The relative position of the fingers in FIG. 8 is the position assumed while hose 148 is collapsed and hose 149 is expanded. In FIG. 9 it can be seen that hose 149 has air pressure released and hose 148 has been expanded by applying air pressure to it. In this manner, the clamping fingers 136 have been forced down on the end of the sheet member 47A in tight juxtaposition as previously clamped by fingers 137. Since the sheet ends overlap, the hose 150 now shares the clamping load with hose 148 that is forcing down fingers 136. As shown in both FIGURES 8 and 9, the tank ends are clamped against a back-up bar 151 which has in it the coolant hoses or tubes 152. This back-up bar within the cooling structure permits necessary cooling during the welding process, which will be described below in detail.

Figure 10:
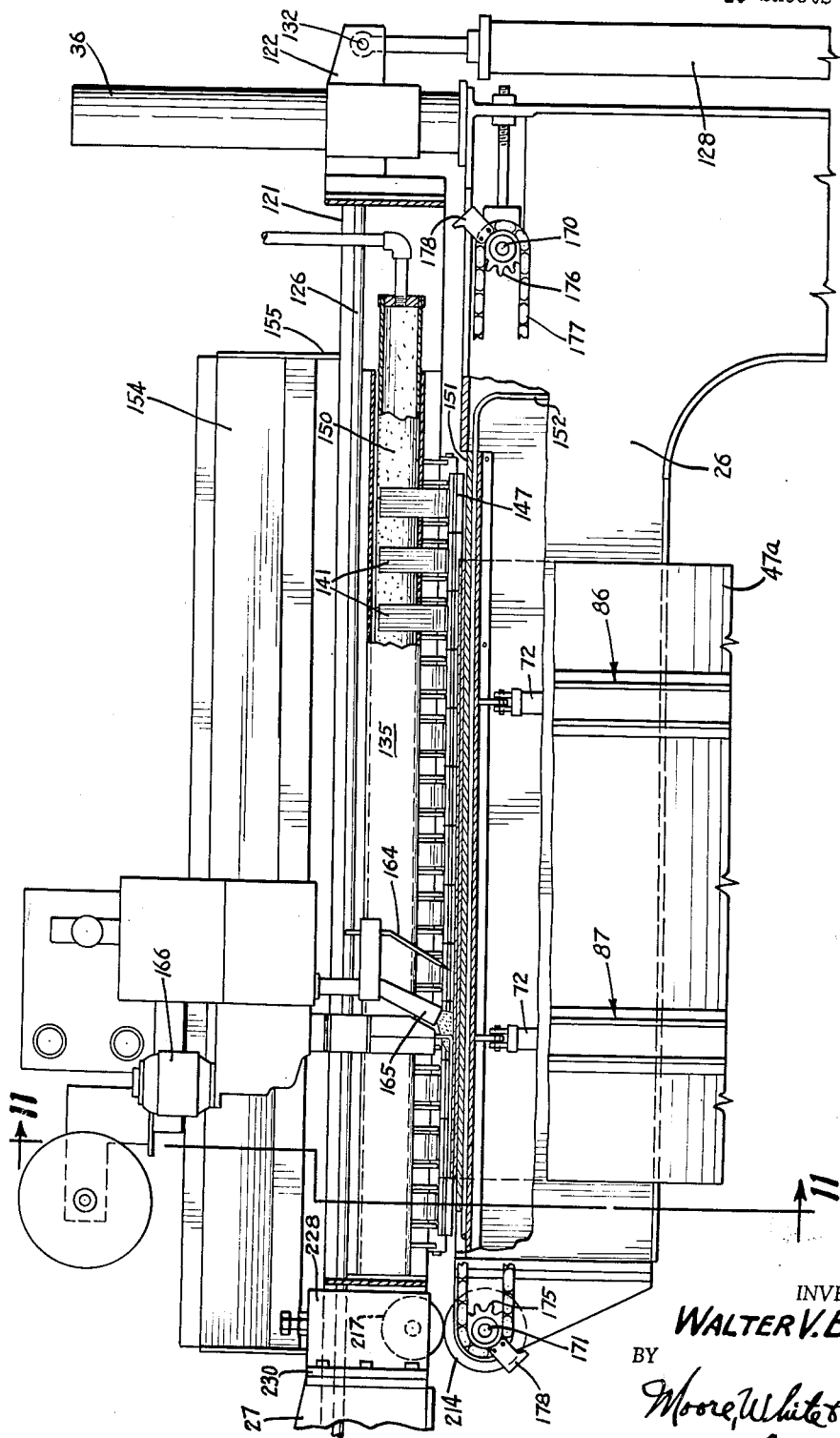
FIGURE 10 is a view similar in scale and otherwise to FIGURES 3–7 except that less of the lower portions of the machine are shown and the tank shell and portions of the machine are broken away to illustrate internal structure; broken lines illustrate hidden parts.
Figure 11:
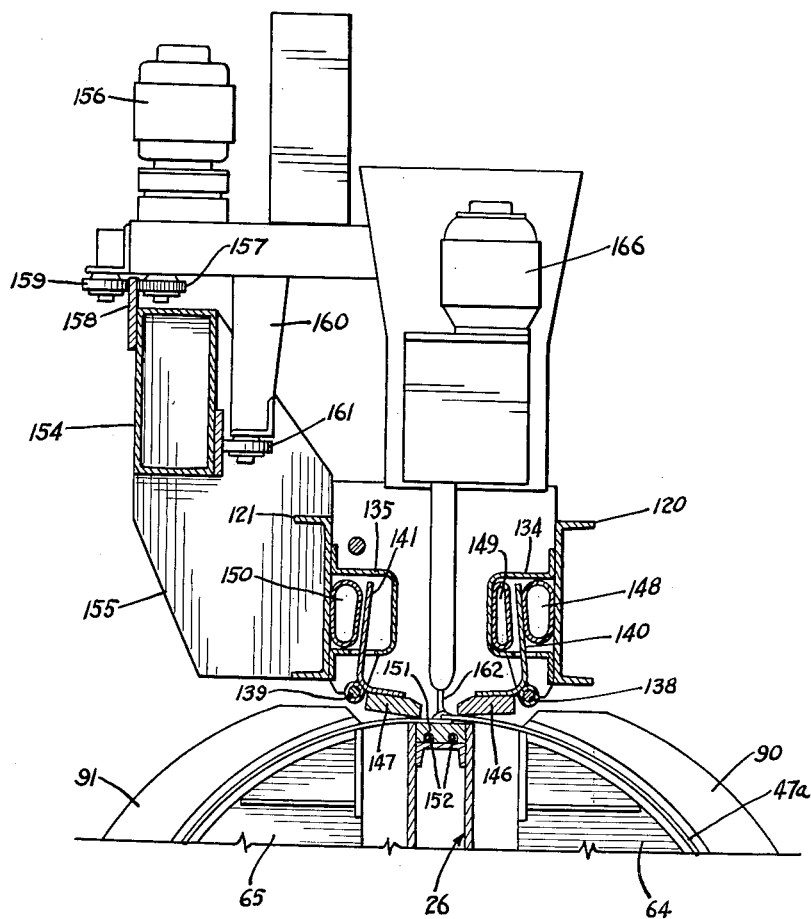
FIGURE 11 is a section in detail on the line 11—11 of FIGURE 10; this figure is drawn to the same scale as FIGURES 8 and 9.

The welding mechanism, as is best seen in FIGURES 10 and 11, may be of any standard market-available type, here shown illustratively as an arc welder. As shown in FIG. 11, the welding mechanism is supported on a box rail 154 that is appropriately secured to the beam structure that carries the clamping mechanism by suitable brackets such as the one designated 155 in that figure. Any appropriate means are provided to keep the welding structure moving along the seam as required, and as shown in FIG. 11, the machine is moved by motor 156, which drives the steel friction drive wheel 157 along a rail 158 that is secured to the box beam. A pressure wheel 159 on the opposite side of the rail provides adequate friction. An arm 160 extends down to support a positioning wheel 161 that engages the beam so as to move the welding wire, or rod, as it became known during the development of hand welding, 162 to the right or left, as required. A suitable pointer mechanism 164 aids the operator in making a straight weld. Flux supplying means 165 excludes air from the welding area in the usual manner. Welding energy is supplied by an appropriate known dynamo (not shown) and connected to the welding wire conventionally. A wire feed 166 automatically provides welding stock in appropriate quantities. As the weld is being performed, the wheels 157 and 159 gripping the rail 158 and driven by motor 156, gradually moves the welding structure down the length of the formed sheet to make a smooth, continuous seam weld. Any of several commercial welding structures similar to this device might be used.

*Ejecting and Guiding*

The ejecting mechanism can be understood by reference to FIGS. 2, 7, 8, 9, 13, 14, 15, and 16. FIGURES 13 through 16 are details of structures shown in association with the rest of the machine in the earlier-numbered figures. Referring now particularly to FIGURES 2 and 7, the ejecting mechanism is seen to consist of a pair of spaced spindles designated 170 and 171 for the right- and left-hand shafts, respectively, as shown in FIG. 2. Since the machine is viewed from the opposite side in FIG. 7, these spindles will be in reversed relationship to the sheet as shown in that figure. Each of these spindles is appropriately journaled in friction-free bearings, such as those illustrated in FIG. 13 and designated 172 and 173 for the right- and left-hand bearings, respectively, as shown in that figure. These spindle carrying bearings are appropriately mounted in the lower arm 26 of the two cantilevered opposing arms. Carried by these spindles on each end thereof are sprockets, which are keyed to the shaft. As shown in FIG. 2, the spindles carry sprockets which are designated 175 for the left-hand one and 176 for the right-hand one. The other sprocket appearing in FIG. 13 on spindle 171 is numbered 174. Over these sprockets is reeved a chain 177 that carries lugs 178 which engage the tank shell. On the opposite side of the machine, visible in FIG. 7, these same two spindles also carry sprockets and a chain this time designated 179, that has secured thereto the lugs 180. As viewed in FIG. 7, the spindle 170 also carries a drive sprocket 181 that hides the sprocket on spindle 170 that corresponds to sprocket 176. Sprocket 181 has reeved over it a chain 182 that engages also an appropriate driving element 184 on a suitable gear reduction mechanism 185. All of the sprockets are appropriately connected to their respective spindles or shafts so that they will rotate whenever the spindles rotate, for example, see the key 186 for sprocket 181 and the key 187 for sprocket 174 on shaft 171, in FIG. 7. Any suitable motor 188 supplies power to speed reducer 185 through a belt and pulley assembly shown at 189 in FIG. 7. Whenever the motor drives the speed reducer and the drive sprocket 181, both of the chains on each side of the cantilevered arm of the frame assembly 26 will move along a path parallel to the top of the cantilevered arm 26, thereby carrying the lugs 180 and 178 into contact with the edge of the formed and welded sheet 47A. In so moving, of course, they engage the sheet edge and it will slide along the top of the cantilevered arm 26 and into the end gripping and guiding structure described below. It will be understood that this sliding action can take place only when the machine is in the position as shown in FIG. 2, when forming arms 90 are lowered and beam 120 is raised.

Referring now to FIGURES 2, 12, and 14 through 16, wherein the sheet gripping, guiding, and supporting structure is shown both generally and in detail, it may be observed that a carriage assembly designated 190 carries on it a pair of gripping elements generally designated 191 and 192 for the left- and right-hand gripping elements in FIG. 14. It will be observed that the bottom plate element 35 of cantilevered arm 27 provides a track means on which ride the wheel assemblies 194 and 195 of carriage 190 for the left- and right-hand wheel assemblies, respectively, as view in FIG. 14. These wheel assemblies support the carriage 190 which, in turn, gives the support for the gripping elements. Thus, we have the gripping elements movably supported on the upper of the two opposed vertically-misaligned cantilevered arms. As can be seen by looking at FIG. 2, a suitable counterbalance numbered 196 secured to a suitable flexible element, such as cable 197 appropriately reeved over the pulleys 198, 199, and 200, and also secured to carriage 190, provides a means that yieldingly urges the carriage assembly for the gripping members toward the end of arm 27 and, since arm 27 faces arm 26, toward that arm end also. As can be seen by viewing FIG. 16, the gripping elements are generally open until they are engaged by something to be gripped. As shown in that figure, an element such as the finished tank shell 47A is just approaching the angled pressure foot 201. As the pressure foot is engaged by the formed sheet element 47A, however, a sensing wheel designated 202 engages the formed sheet 47A and, as the wheel rides to the top of the sheet, actuates a switch shown only on FIG. 17B (number 344) that initiates gripping. Actuating the switch causes a valve (345 on FIGURE 17B) to allow air pressure to extend air cylinder 203. This cylinder is appropriately pivoted to the upper part of the box frame assembly as at 204. A gripping finger 205 is pivoted to pressure foot 201 at 206 and to the other end of air cylinder 203 at 207. As cylinder 203 extends, the position of gripping finger 205 is altered from the open position of FIG. 16 to the closed position of FIG. 15. Finger 205 operates through an appropriate openings 208 in the pressure foot, as shown clearly in FIGURES 15 and 16. Carriage 190 extends up at the outboard ends to support the gripping elements 191 and 192. They are secured to the carriage as to be movable vertically, however, as by the nut and bolt assemblies 209 in FIG. 15 extending through radiating slots 210 in carriage 190. A desired position for a given size of formed sheet is held by clamping the gripping elements to carriage 190 by tightening nut and bolt assemblies 209. As the end of the formed seamed sheet is sliding off of cantilevered arm 26 under the influence of the ejecting chains and lugs, the gripping elements and their carriage support guide the sheet in respect to the planishing rolls described below. As the carriage moves away from the arm 26, the counterweight 196 is raised up. As shown in FIG. 2, there is a stop, in the throat of arm 27, numbered 211 which the carriage can engage with an adjustable striker element 212 mounted on the carriage. When carriage striker 212 engages the stop, the circuit for the gripping mechanism air control valve is broken and the gripping fingers are opened. As the distance between the carriage in its forward position toward the end of cantilevered arm 26 and the stop 211 is adjusted or set for the size of sheets being formed and seamed, and when this stop is hit and the fingers released, the sheet is free to drop in the direction of the base 20 of the frame of the machine. Suitable structure, not material herein and hence neither described nor shown in these drawings, accepts the sheet in this condition and forwards it to the next work station. While the ejecting is going on and before the tank is released, another procedure is carried out known as planishing, which will now be described.

*Planishing*

Figure 13:
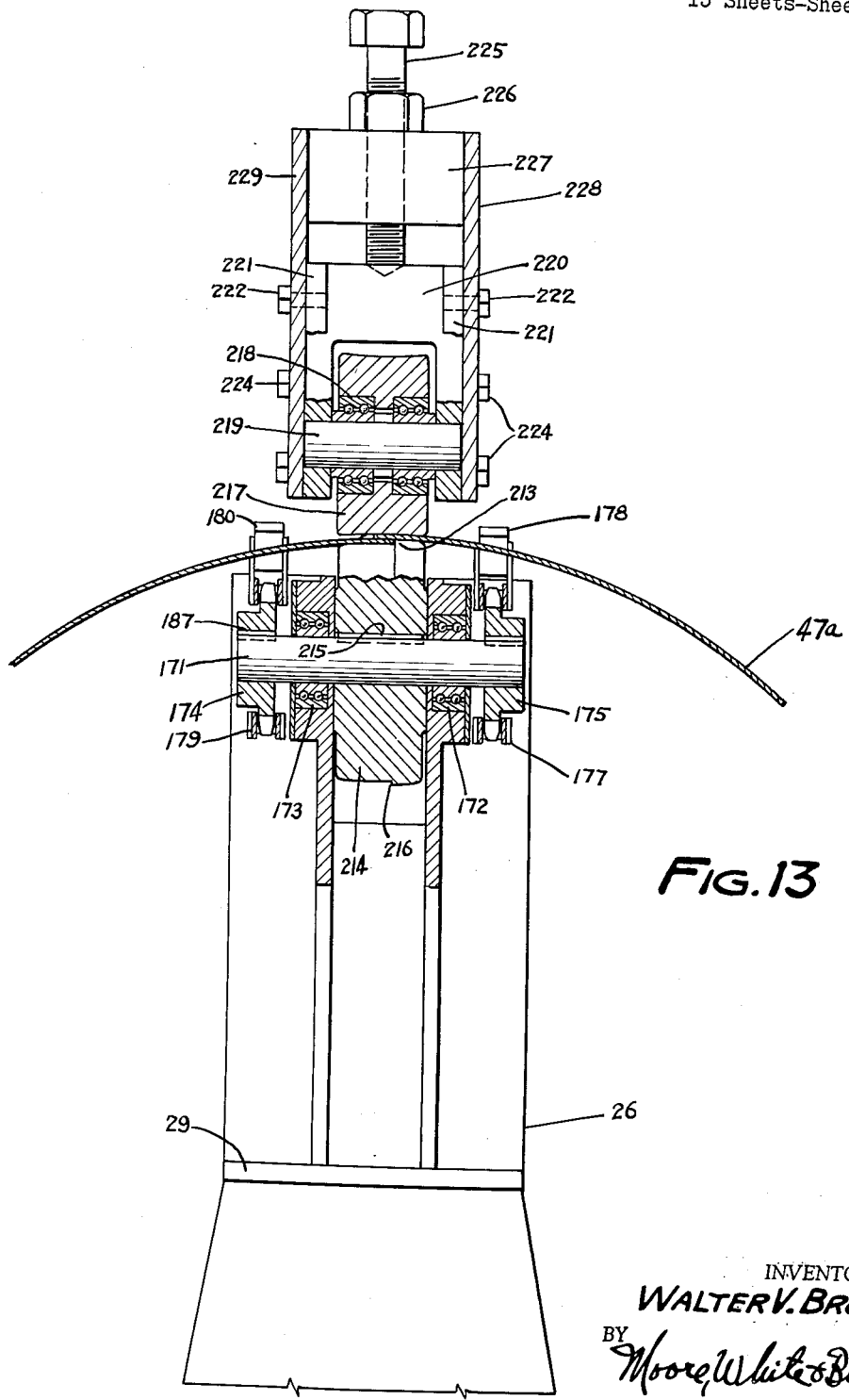
FIGURE 13 is a fragmentary sectional view taken on the line 13—13 of FIGURE 12, and it is drawn to a scale larger than that used in FIGURES 8, 9, and 11.

A structure for accomplishing a treatment of the welded seam known as planishing or cold working of the finished weld is perhaps best illustrated by the vertical section FIG. 13. In that figure, a seam treating element, here a planishing wheel, designated 214, is shown mounted in arm 26 by being fixed in relation to shaft 177 as to rotation by a suitable key 215. Also shown in that figure, sprocket 175 and its complementary sprocket are seen to be substantially smaller in diameter than is the planishing wheel. 214. For this reason, the surface or lineal speed of the chains ejecting the tank will be somewhat less than the surface or lineal speed of the circumference of wheel 214. Therefore, as the tank sheet is ejected from the forming, clamping, and welding mechanism by the lugs 168 and 180 on chains 177 and 179, respectively, the planishing wheel surface will be moving at a greater speed than the surface of tank shell 47A being ejected. This action causes planishing and cold working of the tank weld to improve the joint. The planishing wheel structure is carried by the cantilevered arm 26. Above the planishing wheel and opposed to it, and carried by cantilevered arm 27, is a second seam treating element, here a bucking or idler wheel 217 which holds the tank shell 47A down against the planishing wheel 214. Bucking wheel 217 has a concave, in section, outer surface to fit the concavity of the exterior of the tank shell 47A. On the other hand, the planishing wheel is provided, in the case of a wheel for lap joints as shown herein, with a shoulder 216, which fits against the tank shell lap joint shoulder as at 213.

Bucking wheel 217 is rotatably mounted with appropriate bearings 218 on the shaft 219. The shaft, in turn, is carried by the sliding yoke 220. This yoke is contained between the vertical guides, a fragment of which is shown at 221 in FIG. 13. Suitable means such as the bolt 222 secure the vertical guides in position. There are similar vertical guides at the rear of yoke 220, although they are not shown in this view. The two lower bolts on each side which hold the rear vertical guides in a vertical position are shown, however, at 224. With the vertical guide providing a sliding channel for yoke 220, its upper limit of movement can be determined by the set bolt 225. Once the proper clearance between the bucking wheel 217 and the planishing wheel 214 has thus been set, a jamb nut 226 may be tightened against block 227 to secure the set bolt 225 in its adjusted position. Set bolt 225 would be adjusted only occasionally when the gauge of material used in making tank shell 47A is changed, for example. The flanged side pieces 228 and 229 that form a frame for the entire bucking wheel assembly are rigidly secured to block 227. As shown in FIG. 6, the frame assembly for the bucking wheel is rigidly secured to the end of cantilevered arm 27 in a suitable manner as by bolts 231 extending through flange 230. A similar flange for the side 229 is visible in FIG. 7 at 232, although the detail of the bolt heads securing it to arm 27 have been omitted.

The machine also includes a movable operator's platform shown in FIG. 1. This operator's platform consists of a pair of parallel hangars designated 240 and 241 in FIG. 1 that are secured to the overhead support element 242 in that figure. The overhead support element is secured to any reasonable means of support, such as the I-beams 244 forming a part of the building in which the machine is used. With the exception of the I-beams, the structure just described is duplicated at the opposite end of the operator's supporting platform 245, which is thus swung at each end by the parallel hanger structures. A railing 246 is pivotally secured to all the hangers and surrounds the platform 245 as a safety measure. The entire structure may be moved back and forth, therefore, as shown by the difference in position between the broken-lined and the solid-lined showings in FIG. 1, wherein the broken lines illustrate the position of the platform advanced so that the operator can examine at close hand the welding process. Solid lines illustrate the operator's platform retracted, which is the position taken by the platform before the clamping arms are moved very far from the fully clamped position, as shown in FIG. 5. A single cylinder is adequate to drive the operator's platform, it being connected to a shaft 249 that extends between a pair of ears such as the one 250 on hanger 240. By this means, substantially equal force is applied to corresponding hangers of each pair in order to move the operator's platform forward or to retract it. As will be described below in connection with the electrical, hydraulic, and air diagram, FIGURES 17A and 17B, the action of the platform supporting the operator controlling the machine is automatically related to the operation of the forming arms.

In describing FIGURES 17A and 17B which together form a combination hydraulic electrical and air diagram of the machine power circuit, a disclosure of the relationship between control and power units to each other and to the structure previously described will be given. The power diagram, as shown in FIGURES 17A and 17B, is rather involved with solid lines used to show both hydraulic and electrical lines, while an irregular broken line is used to designate air lines. There is little likelihood of confusion between electrical and hydraulic lines, as the electrical leads connect to symbols fairly recognizable as solenoids or switches, while the hydraulic lines invariably lead to cylinders. Since the circuit is rather involved, the various portions that provide movement to accomplish the various functions as, for example, loading, which will be taken up first, are described separately.

*Loading*

Loading is initiated from a control panel 255 shown in FIG. 17A. The switch 256 specifically initiates loading.

When this switch is actuated, valve 257, which controls flow of hydraulic fluid to the cylinder operating loading arm 48, is moved electrically to a position to apply hydraulic power to cylinder 54 so as to extend it. The electrical circuit for valve 257 comprises not only the main control switch 256 but also a micro-switch 258 that is a safety switch which is open so as to prevent current flow except when the forming arms are standing open ready to receive a sheet. This switch is connected by line 259 to the switch 256. Line 260 connects the switch 256 to one electrical actuator for valve 257. Hydraulic power to actuate cylinder 54, when the electrical circuit controlled wilfully by the main switch 256 is completed, is derived from a usual hydraulic system, including a reservoir 261 that provides hydraulic fluid through line 262 to a hydraulic pump 263. The pump supplies power through a short, unnumbered line to the usual pressure overload valve 264. From the overload valve one line 265 returns to the reservoir 261 in the event of excess pressure being developed. On the other side of the valve, a line designated 266, which may be referred to as the main hydraulic pressure manifold, extends from the pressure side of the relief valve out to supply hydraulic power for the various hydraulic units. As to the loading system, we are principally interested in tracing line 266 across to cylinder 54, which is accomplished by a branch line 267 which connects to a pressure regulator of standard type 268 which, in turn, is connected by a line 269 to valve 257. Depending on how it is actuated, valve 257 can either leave both of the lines 270 and 271 without pressure on them, or can connect line 269 to a selected one of them. In the case of loading action where cylinder 54 is to be extended, the valve is actuated by an electrical circuit as described previously as to connect line 269 to line 270. Hydraulic pressure is thereby applied behind the piston in cylinder 54 causing arm 48 to move to the left, as shown in solid lines in that figure. At the same time, line 271 is connected by valve 257 to line 272 which, in turn, connects to the main hydraulic return manifold designated 274.

As arm 48 leaves the right-hand arm stop designated 42, it reacts with the switch designated 275 secured to the stop as to close this switch, it being open when arm 48 is in the position illustrated with broken lines. Through a line designated 276, switch 275 is connected to a second switch, which is spring-loaded open, and designated 277. Switch 277 is secured physically to the sheet pick-up or gripping member 52. Switch 277 is actuated to the closed position by the gripping member being lowered into solid contact with the sheet of material to be lifted. A line 278 connects the switch 277 to the electrical control of a valve designated 279. When arm 48 is in any position except that illustrated by broken lines in FIG. 17A, therefore, and when the pick-up element 52 is in solid contact with a sheet of material, an electrical circuit is completed through lines 276 and 278 through the switches 275 and 277 and the electrical portion of valve 279 to a suitable source of electrical energy (not shown) causing valve 279 to be actuated as to apply pressure from main air pressure manifold 280 through line 281 to a jet-type vacuum pump 282 that creates a low pressure area for pick-up 52.

When arm 48 reaches the stopped position against stop 41, as shown by the solid lines in FIG. 17A, a switch designated 284 is actuated which, in turn, supplies electrical energy through line 285 to actuate an air valve 286. Air from the main air manifold 280 is then applied through valve 286, and a short line therefrom designated 287 to the upper end of air cylinder 50 which extends, lowering the pick-up 52 toward a sheet of material waiting to be loaded. As the cylinder 50 extends and lowers the gripping element 52 toward the top sheet of a stack of sheet material waiting to be loaded, it carries with it, secured to the gripping element 52, a switch designated 288 which is similar to switch 277 except that it is connected by line 289 to valve 257, the control valve for cylinder 54 of arm 48. When the switch 288 is actuated, it causes valve 257 to reverse its previous position, which extended cylinder 54, and causes cylinder 54 to retract. This is done conventionally within the valve by connecting hydraulic pressure line 266 via the power regulator 268 and line 269 to the line 271. At the same time, line 270 is connected to the hydraulic return line 272 by valve 257. Line 272 joins the main hydraulic return 274 back to reservoir 260. When arm 48 reaches the position shown in broken lines in FIG. 17A, the switch 275 is engaged by the arm and forced open, which breaks the circuit that normally holds valve 279 in a position to create vacuum in pick-up 52. As soon as this circuit is broken, valve 279 is returned to a position that ceases applying air pressure to the vacuum jet-type pump 282 which causes pick-up 52 to release the sheet onto the gravity conveyor, as shown in FIG. 1. Sheet 47 then rolls down the gravity conveyor until it engages a stop (not shown) which carries on it a switch designated 290 and shown in FIG. 17B, which switch, when a sheet engages it, indicates electrically that the sheet has rolled entirely into the forming machine. This switch through a line designated 291 actuates an electrically controlled valve 292 to apply air pressure through a line designated 294 connecting the valve 292 to the main air manifold 280. Air pressure is then applied through the valve, and a line designated 295 to the air cylinder 59 which is known as the squaring cylinder, and has been described above and appears in FIGURES 2 and 6. This cylinder, with air applied through line 295, extends and pushes the sheet 47 against squaring stops that are not shown. Shown, however, are switches designated 296 and 297 for the right- and left-hand switches, respectively, that indicate the sheet has been squared with the forming mechanism. A line 298 connects switches 296 and 297 together in series, and a line 299 connects the two switches to a valve 300. Consequently, a sheet must engage both of the switches 296 and 297 before valve 300 is actuated. Valve 300 is the main hydraulic control valve for the forming power mechanism which will now be described.

*Forming*

As soon as valve 300 is actuated by the engagement of sheet 47 with the two micro-switches 296 and 297, the hydraulic line 301 that connects line 266, the main hydraulic pressure manifold, to valve 300 is connected through that valve to hydraulic line 302 which leads to the lower ends of the hydraulic cylinders 94 and 95 as shown in FIG. 17B. Hydraulic pressure applied to the lower end of the cylinders 94 and 95, while line 304 is connecting the upper end of the same cylinders to the return manifold 274, causes cylinders 94 and 95 to extend. As cylinders 94 and 95 extend, restraining force on air cushion cylinder 85 is released, allowing it to extend under constant air pressure applied to the lower end thereof through line 305 that connects it to the main air manifold 280. As shown in FIG. 4, this action of cylinder 85 in response to the release of the yoke structure by the movement of cylinders 94 and 95 causes the yoke 84, represented in the diagrams by the H-beam which carries the yoke and designated 84 in FIG. 17A, to rise up and begin to wrap the sheet around the mandrels. Simultaneously, with the movement of cylinders 94, 95, and 85, a pressure line designated 306 connects the right-hand end of the cylinders 72 and 72A as shown in FIG. 17A to hydraulic pressure, extending both cylinders 72 and 72A. A return line 307 allows the hydraulic fluid in the forward end of these cylinders to be returned to the reservoir. Cylinders 72 and 72A expand the mandrels as shown in FIGURES 4 and 5, to provide a form around which the forming arms can bend the sheet 47 into the tank shell form 47A. With the completion of the forming action, clamping action is initiated automatically as follows. As the last movement to complete forming is the final movement of the forming arms 90 and 91, a switch designated 308 is actuated by the final movement of one of these arms, as shown in FIG. 17A, being arm 91. Upon the closing of switch 308, power is applied through line 309 to the valve 310. This valve 310 controls the cylinders that raise and lower the clamping mechanism. A line designated 311 connects the main hydraulic manifold to valve 310. A line 312 from the valve 310 connects also to the upper (or rod) ends of cylinders 128 and 129. At the same moment, valve 310 through a line designated 314 and a second line designated 315 connects the lower ends of the cylinders to the return hydraulic manifold 274. As the cylinders 128 and 129 lower the clamping mechanism toward shell 47A, they finally engage, with the correct positioning of the clamping mechanism in respect to the shell, a switch designated 316 which controls the valve to the clamping finger structure. An electrical line designated 317 connects the switch 316 to valve 318. Upon the actuation of this valve by switch 316 being closed, the line 319 from the main air pressure manifold 280 is connected to air-containing hose 148 by way of line 322. Also, it should be pointed out that the air hose 150 is constantly connected to the main air pressure manifold, as shown in FIG. 17A, through line 319 and short junction line 321. As air pressure is originally being applied to the air hoses 150 and 149, the fingers 136 and 137, respectively, are held in the position shown in FIG. 17A. Thus, the fingers 137 engage and push down part of the lap joint of shell 47A in advance of the action of fingers 136. Upon the reaching of the final down position of the clamping mechanism, however, and with the actuation of switch 316, valve 318 is actuated as to apply air pressure from the main pressure manifold to air hose 148 via the line 322. At the same time, air hose 149 is exhausted through line 320 and hose 149 is collapsed and 148 expanded, by the action of the valve 318 just described. The position of clamping finger 136 is altered, therefore, in that hoses 149 and 148 would be exactly reversed in condition from that shown in FIG. 17A. With the hose 148 expanded and 149 collapsed, fingers 136 would be forced down against the now-open edge of the lap joint on the circle representing shell 47A forcing the joint closed ready for welding. The welding operation is under the manual control of the operator, and is not, therefore, shown on this drawing, particularly since the welding structure is not novel in itself. The operator's platform, however, is believed novel in its motion to and from the machine to permit observation of the welding operation as it is being controlled, and we now turn to a description of that control circuit.

*Operator's Platform*

As shown in FIG. 17A, the switch 308 on arm 91 also connects to a toggle switch 324 on a control panel 255. This is accomplished by a line designated 325. Another line 326 extends from the toggle switch 324 and to sheet 17B to a valve electrically operated and designated 327, which controls air pressure applied to cylinder 247 that controls the operator's platform. When toggle 324 and switch 308 are both closed, the former manually and the latter by forming arm 91 being in the completely closed position for forming shell 47A, an electrical circuit is completed to valve 327. When the valve 327 is energized electrically, it applied air pressure from main air manifold through valve 327 and to cylinder 247 by way of the connecting line 328. At the same time, a line 329 which is connected to the valve 327 at the lower end of cylinder 247 is opened to the atmosphere thus allowing cylinder 247 to extend and, in so doing, to apply an advancing force to the operator's platform vertical hanger 240, as shown in FIG. 17B. Under these circumstances, the operator's platform is advanced to the position shown in broken lines in FIG. 1 thereby placing the operator near the welding apparatus of the machine and permitting close observation of the welding operation. Upon completion of the welding operation, the operator may either manually return his platform to the position shown in solid lines in FIG. 1 and also illustrated in FIG. 17B or he may begin to release the clamping and forming structure which would cause the switch 308 to be actuated, automatically returning valve 327 to a position applying air pressure to line 329, and exhausting through line 328 to retract cylinder 247, and hence his platform.

*Release of Forming Structure*

Opening of the forming structure and thereby releasing tank shell 47A for ejecting is accomplished or initiated by a switch designated 330 on panel 255. This switch, through a line designated 331, applies electrical energy to valve 300 moving it in the opposite position to that accomplished by the switches 297 and 296. When valve 300 is moved to the opposite position from that position which is had for forming, the lines 302 and 304 are reversed as to their connection to pressure and returned hydraulic manifolds. Line 302 is now connected by way of the valve to return manifold 274, while the line 304 is connected to the pressure hydraulic manifold 266. This causes the cylinders 94 and 95 to be retracted. At the same time, the lines 307 and 306 are reversed simultaneously with the action reversing the application of pressure and release to lines 302 and 304 thereby causing pressure to be applied to line 307 while 306 is exhausting to collapse the mandrels. Retraction of arms 90 and 91 also overpowers air pressure in cylinder 85 and causes yoke 84 to lower. Upon the movement of the forming arm 91 toward the open position, switch 308 is opened and, via line 309, releases valve 310 to permit the raising of the clamping mechanism which, in turn, releases switch 316 and causes the fingers 136 and 137 to be returned to the position shown in FIG. 17A as they are raised away from the shell 47A. When the forming arms have opened up completely, and the mandrels have been collapsed completely, it is possible for the ejecting mechanism to be operated.

*Ejecting*

Ejecting is initiated by a manual switch 332 on control panel 255. This switch is connected by the line 334 to a switch designated 335 that is open except when the yoke 84 is in the completely lowered position. A line 336 connects switch 335 in series with a pair of switches designated 337 and 338, those two being interconnected by line 339. Another line from the switch 332, this line being designated 340, extends from switch 332 on control panel 255 to the representation of the ejecting motor and speed reducer 188 and 185, respectively, in FIG. 17B. Upon the energizing of this drive mechanism, which can only occur when the switch 335 is held closed by the forming arms being down and the switches 337 and 338 are held closed by the complete collapse of the mandrels, the sprocket 181 is driven moving spindle 170, chains 177 and 179 with their respective lugs 178 and 180, respectively, engaging the end of the tank shell 47A driving it through the planishing and bucking rolls and off of cantilevered arm 26. As soon as the mechanism has moved far enough for one of the lugs to have released a limit switch 341, the mechanism will continue to drive the tank shell off of the mandrels and cantilevered arm 26 until the second pair of lugs reaches the position shown in FIG. 17B as engaging switch 341. This action breaks the circuit for the motor 188 of the ejecting mechanism. Automatic stopping of the ejecting mechanism takes place only after the shell has been completely ejected from the machine, however. A line designated 342 connects the switch 341 to line 340.

Figure 12:
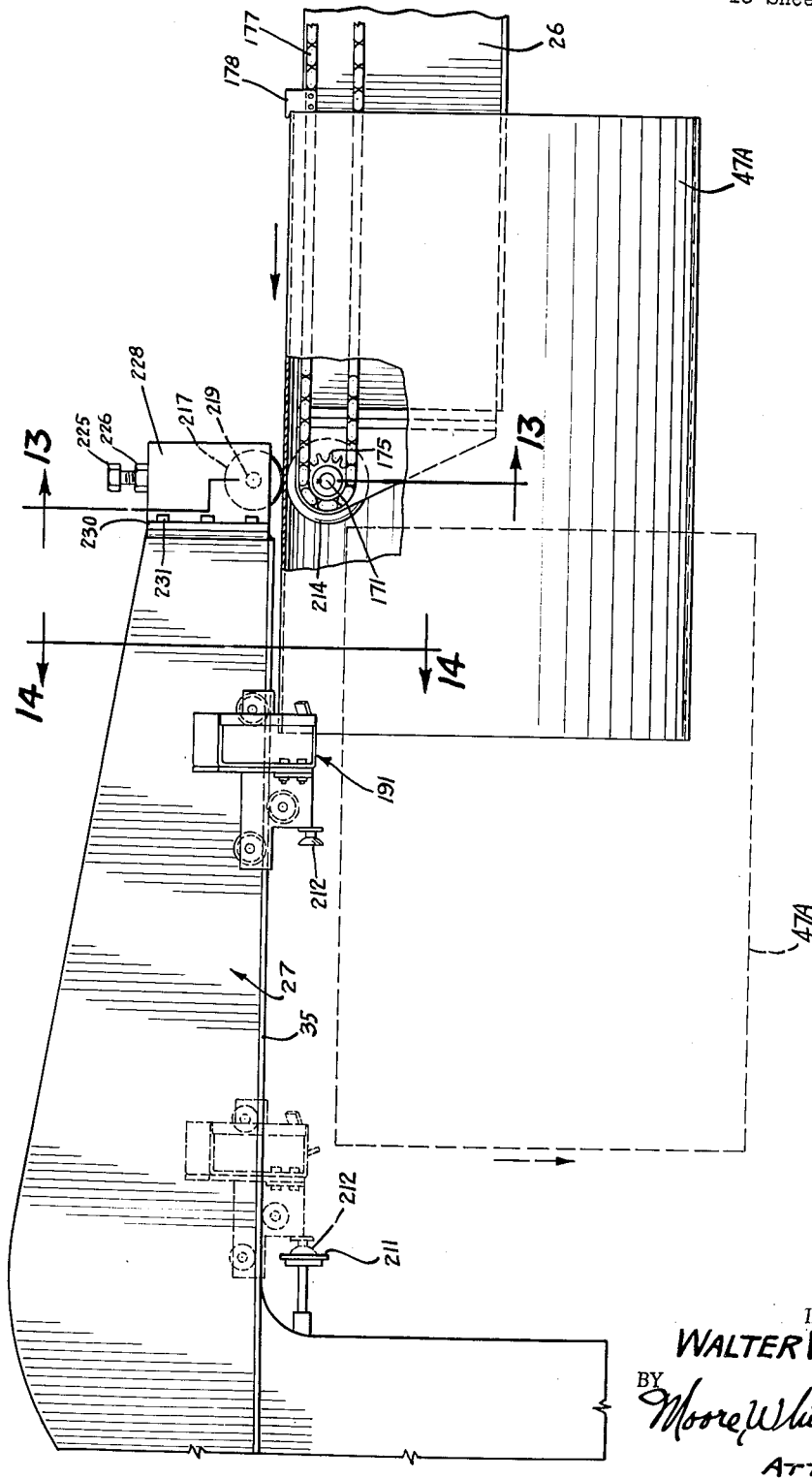
FIGURE 12 is drawn to the same scale as FIGURES 3–7, and it is a fragmentary side elevation of the ends of the opposed cantilevered arms. A portion of a tank shell on the machine is broken away to illustrate the machine more fully; broken lines illustrate adjusted and hidden parts.

As the shell 47A is being ejected from the machine, it is gripped at its outer edge by the gripping mechanism described above and shown in FIGURES 14, 15, and 16. The power system for actuating and interrelating this gripping system with the rest of the structural mechanism is illustrated in FIG. 17B. In that figure, a switch designated 344 which is actuated by sensing wheel 202 in FIGURES 15 and 16 energizes a valve designated 345 which controls the application of air to cylinders 203 and 203A. Air line designated 346 connects the valve 345 to the main air manifold 280. The two gripping cylinders are connected to valve 345 by means of the lines 347 and 348. Whenever the switch 344 is actuated when sensing wheel 202 is engaged by the shell 47A, the valve 345 is actuated to apply air pressure to the cylinders 203 and 203A. A switch designated 349 that is normally closed under spring tension is opened whenever the tank shell is completely through the planishing roll. This is accomplished by the element 211 being struck by the element 212, as shown in FIG. 12, for example. A line designated 350 connects switch 344 to switch 349 so that they are in series in the same circuit. As the switch 349 is energized, therefore, the gripping circuit switch 344 is rendered ineffective by the opening of switch 349. Valve 345 releases air pressure from the air cylinders 203 and 203A, which causes the tank shell 47A to be released. The tank is then free from both the cantilevered arm 26 and the gripping finger guiding structure that supports the end of the tank as it is being moved through the planishing and bucking rolls and the tank is free to move by suitable means (not a part of this invention) to the next stage of the development.

It is apparent that many modifications and variations of this invention as hereinbefore set forth may be made without departing from the spirit and scope thereof. The specific embodiments described are given by way of example only, and the invention is limited only by the terms of the appended claims.

I claim:

1. In a machine for forming sheet material into seamed hollow shapes open at the ends; a frame comprising; a central portion; an upper fixed cantilevered arm secured to one end of said central portion and extending toward its center; a lower fixed cantilevered arm secured to the other end of said central portion and extending toward its center; both of said fixed cantilevered arms being spaced from said central portion and overlapping each other at the extremities thereof; a vertical column secured to said upper fixed cantilevered arm; a vertical column secured to said lower fixed cantilevered arm; a beam slidably mounted on said columns; means secured to said fixed cantilevered arms and said beam for raising and lowering said beam selectively; and equalizing means operatively associated with said beam and said columns causing the ends of said beam to move equally.

2. The machine of claim 1 in which said equalizing means comprises; a shaft rotatably secured to said beam; gears secured to said shaft near said columns; and racks on said columns engaged by said gears.

3. In a mechanism for guiding sheet material being ejected from a machine; a frame; ejecting means secured to said frame; a fixed cantilevered arm secured to said frame and extending toward said ejecting means; a carriage movably secured to said fixed cantilevered arm and biased toward said ejecting means; material gripping means secured to said carriage; power means for actuating said material gripping means; and sensing means secured to said gripping means sensing when material enters said gripping means; and control means secured to and cooperating with said sensing means and said power means.

4. In a mechanism for guiding material being ejected from a machine through a treating mechanism; a frame; a first cantilevered arm secured to said frame and underlying the material being ejected from the machine; ejecting means secured to said first cantilevered arm; a second cantilevered arm secured to said frame and extending toward said first cantilevered arm in a higher plane; a carriage movably secured to said second cantilevered arm and biased toward said first cantilevered arm; material gripping means secured to said carriage; power means for actuating said material gripping means; a sensing element movably secured to said gripping means; said sensing element moved by material entering said gripping means; and means carried by said gripping means and actuated by said sensing means to control said power means.

5. In a machine mechanism for ejecting sheet material from a machine including a frame and seaming mechanism secured to the frame; a first cantilevered arm secured to said frame and underlying a portion of the seaming mechanism of said machine; a pair of spindles journalled in said first cantilevered arm; a pair of sprockets secured to said spindles; a chain reeved over said sprockets; sheet-engaging lugs secured to said chain; means driving one of said spindles at times; a second cantilevered arm secured to said frame and extending toward said first cantilevered arm; a seam treating means operatively associated with said spindles, chain, and sprocket; a cariage movably secured to said second cantilevered arm and biased toward said first cantilevered arm; a sheet gripper secured to said carriage; means for actuating said sheet gripper, and means secured to said gripper for sensing when said sheet gripper engages a sheet.

6. In a machine mechanism, guiding sheets being treated as they are being ejected from a machine having a frame and welding mechanism secured to said frame; a first cantilevered arm secured to said frame and underlying a portion of said welding mechanism; a pair of spindles journalled in said first cantilevered arm; a pair of sprockets secured to said spindles; a chain reeved over said sprockets; sheet-engaging lugs secured to said chain; means for driving one of said spindles at times; a second cantilevered arm secured to said frame extending above and toward said first cantilevered arm; a planishing wheel larger than said sprockets on one of said spindles; a bucking wheel rotatably secured to said second cantilevered arm and positioned above said planishing wheel; a carriage movably secured to said second cantilevered arm and biased toward said first cantilevered arm; a sheet gripper secured to said carriage; means for actuating said sheet gripper, and means secured to said gripper and actuating means sensing when said gripper engages a sheet.

7. In a machine for seaming sheet material: a central frame portion; a first cantilevered arm secured to one end of said central frame portion extending upward therefrom and toward the center thereof; a second cantilevered arm secured to the other end of said central frame portion and extending upward thereof and toward the center thereof above said first cantilevered arms; a column extending vertically above each of said cantilevered arms; a beam slidable on said columns; racks of said columns adjacent the ends of said beam; a shaft rotatably mounted on said beam; two like gears secured to said shaft and engaging said racks; beam cylinders secured to the ends of said beam and said frame; seam welding means secured to said beam; a pair of spindles rotatably secured to said first cantilevered arm; a pair of sprockets secured to said spindles; a chain reeved over said sprockets; sheet-engaging lugs secured to said chain; means for driving one of said spindles; a carriage movably secured to said second cantilevered arm and biased toward said first arm; a sheet gripper secured to said carriage; means for actuating said sheet gripper, sensing means secured to said gripper and operatively associated with said actuating means sensing when a sheet engages said gripper; a planishing wheel larger than said sprockets secured to one of said spindles; and a bucking wheel secured to said second cantilevered arm above said planishing wheel.

8. The machine of claim 7 in which said planishing wheel has a portion of smaller circumference than the remainder of said planishing wheel; and said bucking wheel has an exterior surface that is concave in section.

References Cited in the file of this patent

UNITED STATES PATENTS

| | | |
|---|---|---|
| 734,759 | Sleeper | July 28, 1903 |
| 945,875 | Thompson | Jan. 11, 1910 |
| 950,742 | Black | Mar. 1, 1910 |
| 1,371,833 | Youtsey | Mar. 15, 1921 |
| 1,964,885 | Lewis | July 3, 1934 |
| 2,039,857 | Vetorino | May 5, 1936 |
| 2,089,840 | Rockefeller | Aug. 10, 1937 |
| 2,187,740 | Hotersall | Jan. 23, 1940 |
| 2,188,326 | Windsor et al. | Jan. 30, 1940 |
| 2,236,848 | Graham et al. | Apr. 1, 1941 |
| 2,385,109 | Seltzer et al. | Sept. 18, 1945 |
| 2,515,230 | Jones et al. | July 18, 1950 |
| 2,517,574 | Jones et al. | Aug. 8, 1950 |
| 2,578,832 | Pearson et al. | Dec. 18, 1951 |
| 2,789,203 | Rigo et al | Apr. 16, 1957 |